United States Patent [19]
Anderson et al.

[11] 3,783,253
[45] Jan. 1, 1974

[54] NUMERICALLY CONTROLLED MACHINE TOOL

[75] Inventors: William T. Anderson, Arlington Heights, Ill.; Robert A. Wallace, Jr., Hacienda Heights, Calif.

[73] Assignee: DoAll Company, Des Plaines, Ill.

[22] Filed: Aug. 13, 1971

[21] Appl. No.: 171,503

[30] Foreign Application Priority Data
Aug. 17, 1970  Great Britain .................. 39,500/70

[52] U.S. Cl. ............ 235/151.11, 318/568, 318/570, 318/573
[51] Int. Cl. .......................................... G06f 15/46
[58] Field of Search .................. 235/151.11, 150.31, 235/152; 318/567–570, 573–574; 90/11.5, 13 C, 13.2, 13.8

[56] References Cited
UNITED STATES PATENTS

| | | | |
|---|---|---|---|
| 3,072,833 | 1/1963 | Kerr et al. ........................... | 318/568 |
| 3,473,157 | 10/1969 | Little et al. ........................ | 318/568 X |
| 3,578,959 | 5/1971 | Perkins et al. ...................... | 235/152 |
| 3,048,832 | 8/1962 | Fitzner ............................. | 318/567 X |
| 3,189,805 | 6/1965 | Poepsel et al. ..................... | 318/574 |
| 3,449,554 | 6/1969 | Kelling ............................ | 318/568 X |
| 3,524,049 | 8/1970 | Götz et al. ........................ | 235/152 X |
| 3,172,026 | 3/1965 | Schuman ........................... | 318/569 X |
| 3,400,314 | 9/1968 | Wilson ............................. | 235/151.11 UX |
| 3,525,917 | 8/1970 | Leenhouts ......................... | 318/570 |
| 3,450,865 | 6/1969 | Peras .............................. | 235/151.11 X |
| 3,259,957 | 7/1966 | Stobbe ............................. | 235/151.11 UX |
| 3,689,892 | 9/1972 | Glenn et al. ....................... | 318/568 |

*Primary Examiner*—Eugene G. Botz
*Assistant Examiner*—Jerry Smith
*Attorney*—Ronald L. Engel et al.

[57] ABSTRACT

A digital processing system is disclosed including manual controls to specify a process (step-by-step) and responsive means to execute the process and formulate an operating program of the process. The controls are related to the steps of the process and coding techniques are unnecessary. Signal generators provide digital signals responsive to the manual controls, which signals control a machine tool (in the disclosed embodiment) and are provided in a suitable form for recording. The system may be controlled to delay recording until the propriety of a step is verified by its performance. Means are included for predicting and accomplishing dimensions on the basis of various simple specifications, as for generating arcs and multiple dimension motions with allowance for tool diameter. On completion of a recorded program of operations, the system is operable under such control.

5 Claims, 18 Drawing Figures

INVENTOR.
William T. Anderson
BY Robert A. Wallace, Jr.

ATTORNEY

FIG. 3.

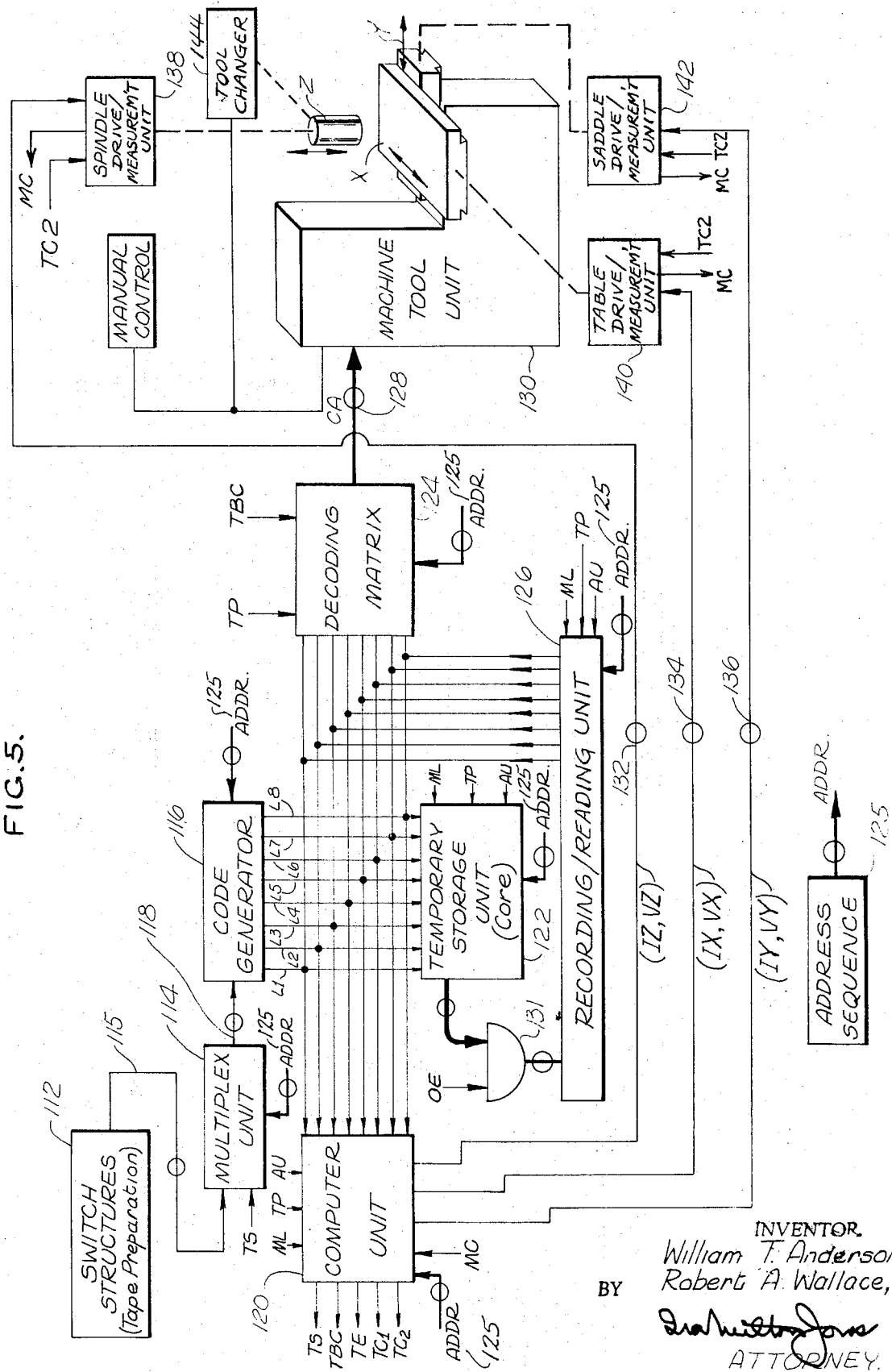

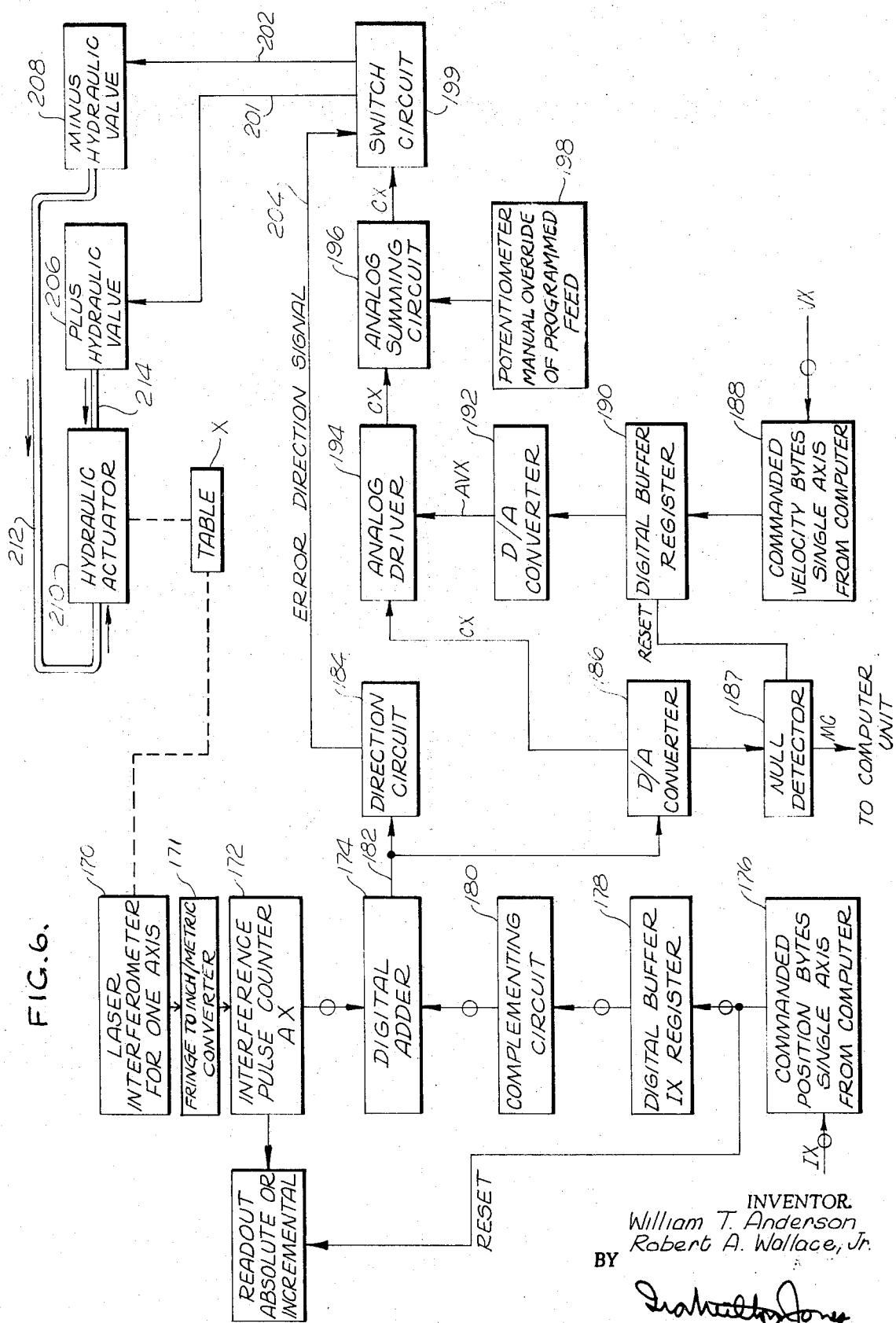

INVENTOR.
William T. Anderson
BY Robert A. Wallace, Jr
ATTORNEY

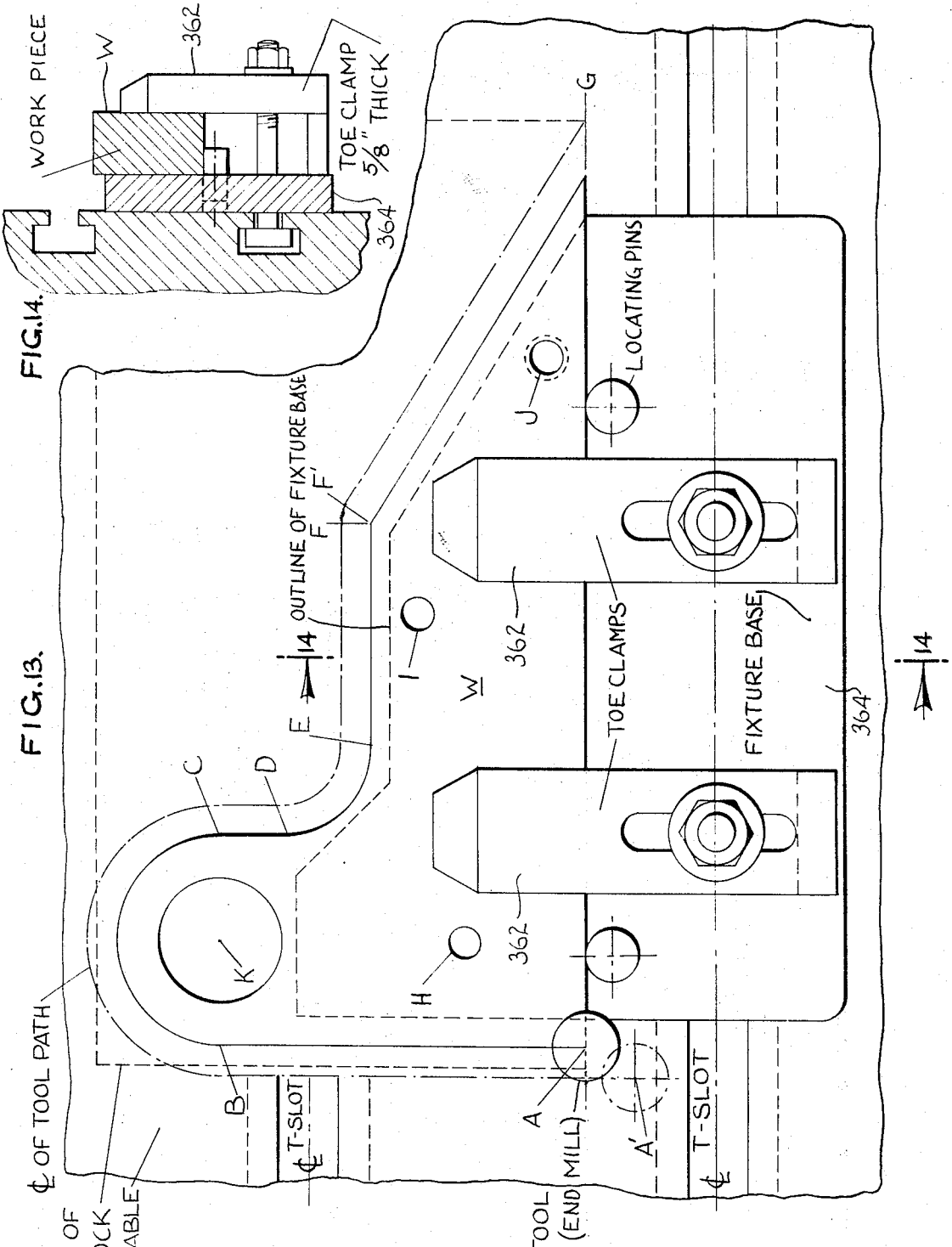

NUMERICALLY CONTROLLED MACHINE TOOL

FIELD OF THE INVENTION

The invention relates to a digital machine that can be manually controlled to operate without the use of a special programming language and subsequently controlled by a program that is generated during the manually-controlled operation.

DESCRIPTION OF THE PRIOR ART

Numerically controlled machine tools have enabled the production of workpieces in any desired quantity and at ideal uniform rates without requiring constant attendance by machine operators, or jigs and similar tooling, thereby: increasing the speed of production on a single machine, enabling a single operator to attend several machines, and reducing the cost per machined workpiece.

Typically with such systems, the designer initially prepares a drawing of the workpiece which is turned over to a programmer. The programmer then determines the machine operations and conditions necessary to machine the workpiece as defined by the drawing. Next, he utilizes appropriate codes to specify each of the required motions and functions in a program of operation for the machine tool. Because there are many lengthy terms in the typical codes, it may be necessary for the programmer to consult a code list in formulating the program. He must also anticipate any problems that might arise that are not indicated on the blueprint, as for example, avoiding raised sections of any holding fixture that otherwise would block the traverse of a tool.

Conventionally, after a set of code terms (program) has been prepared, a tape is punched (either manually or through a computer-controlled tape punch) for communicating the desired machining parameters. The tape is then tested by using it to control a numerically controllable machine. If the machine is not accordingly controlled to operate as intended, the programmer must edit and correct the codes. The test operation must then be repeated.

Conventionally, the program (set of code terms) in all its complexity, is normally beyond the comprehension of the machine operator. This situation is exemplary of many involving the use of programming techniques and computer languages in association with digital computers, machine control systems and data processing units.

SUMMARY OF THE INVENTION

In an exemplary form, the present invention provides a control system for use in cooperation with a machine tool (having a cutter and a work support) for controlling the machine-tool movements to generate desired shapes. Manual controls are provided to specify the various machine movements and functions. In an embodiment hereof, a machinist of ordinary skill can examine a part print and operate the system controls to command the machine movements and functions necessary to produce the part while compiling a record of such movements and functions for subsequently directing the machine through a similar pattern. The control system (responsive to manually-activated switches) generates signal-represented digital information specifying motions and functions for predicting the desired dimensions. Included is the capability of defining operations (linear and non-linear) requiring simultaneous relative movement along at least two axes of the workpiece. Circular cuts can be simply specified and executed.

In one embodiment, the digital signals are temporarily stored while a computer in the system calculates the geometrical forms and magnitudes of motion to accomplish the specified machining operations. When the calculations are completed, the results then control the machine to perform machining operations. If the operation is verified to be correct a recording system makes a permanent record of the digital signals, storing this information in a long-term or permanent fashion e.g. on magnetic tape. The recorded information can then be used to duplicate the recorded operations on a fresh workpiece. As indicated, the recording system is manually controlled to allow the recording operation to be deferred until a machine tool operation has been completed and its function verified.

In the illustrative embodiment, laser interferometer systems detect changes in position between the tool and the workpiece along three axes. Specifically, counters are used to count interference fringes translated to inches to provide the computer with highly-accurate and continuous position information. The values contained in these counters are compared to the commanded positions to thereby generate movement signals. The computer also generates velocity signals which control relative velocities.

In general, the term "computer" is used herein to specify an element of the combination comprising the present invention. In that regard, a general purpose computer may be programmed as well known in the prior art, or special purpose units may be primarily hard wired. In the illustrated embodiment, the "computer" is a single element. It should be appreciated, however, that the functions performed centrally may be distributed and performed, in an alternative embodiment, by modified forms of the several supporting elements comprising the present invention.

BRIEF DESCRIPTION OF THE DRAWINGS

FIG. 3 is a front view of a control panel embodied in the system of FIG. 1, for controlling the production of a desired part and recording that production as a control program;

FIG. 5 is a block and schematic diagram of the system of FIG. 1 in still greater detail;

FIG. 6 is a block diagram of a component part of the system as represented in FIG. 5;

FIG. 13 is a diagram of the part of FIG. 12, illustrative of the formation of the desired part by the system hereof;

FIG. 14 is a cross-sectional view through the structure of FIG. 13, on the plane of the line 14—14.

DESCRIPTION OF THE PREFERRED EMBODIMENT

Figure 1:
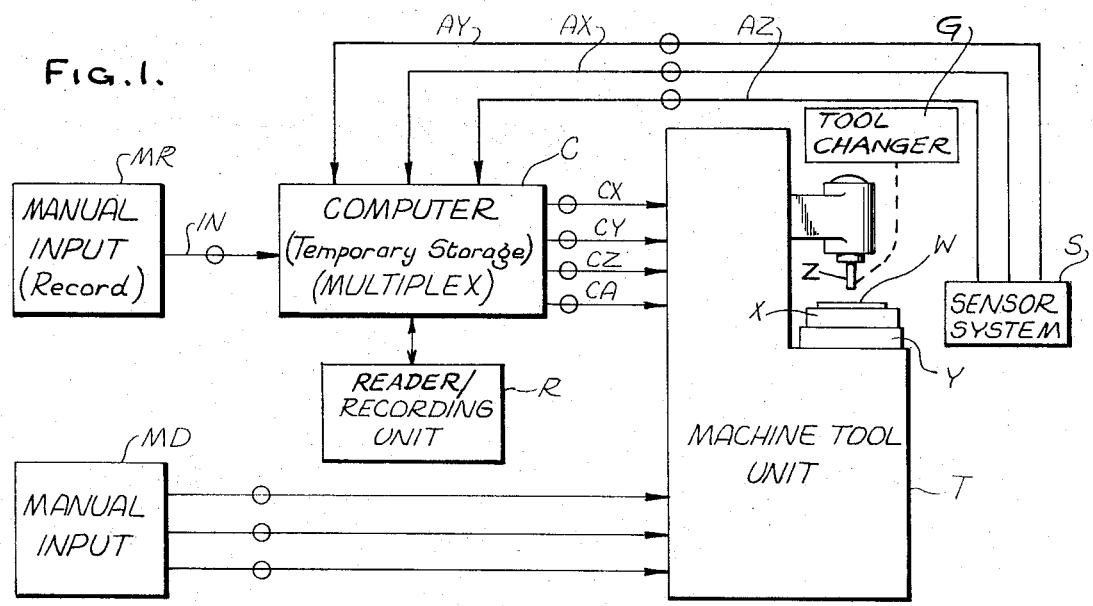
FIG. 1 is a functional block diagram of a system in accordance with the present invention.

Referring initially to FIG. 1, there is shown a machine tool unit T which is incorporated in an embodiment of the present system to accomplish desired machining of workpieces. Of course, the machine tool unit T may take any of a variety of different forms; however, as illustratively described herein, and as utilized in an operating embodiment, the unit T is a three-axis milling machine incorporating an automatic tool changer G.

The machine tool unit T may be controlled by manual-input panels MR and MD or alternatively, control may be provided from a recording unit R. Some of the control operations are accomodated through a computer C, which, as schematically depicted in FIG. 1, includes a temporary storage register, a multiplex unit, code generator, decoding matrix, a standard computer unit and the drive means for the unit T.

The manual control panels MR and MD may be operated in the first instance to control the machine tool unit T to perform operations (through the computer C) that will produce a desired workpiece W and accomplish a record of the operations (program) in the combination recording and reading unit R. Subsequently, that record may be used repeatedly to duplicate the desired workpiece W with very-limited manual supervision of the system.

The machine tool unit T as illustrated, includes a saddle Y which in turn supports a table X carrying the workpiece W. The table X and the saddle Y move perpendicularly in parallel planes while a spindle Z moves perpendicular to those planes, defining the third axis of operation. The spindle Z is revolved to drive a tool (not shown) so as to accomplish the desired cuts in the workpiece W upon relative motion between the workpiece and the spindle Z.

The instant positions of the machine-tool elements (saddle Y, table X and spindle Z) are sensed continuously by a sensor system S which may take the form of three laser interferometers cooperatively associated with counters. Thus, sets of digital signals AZ, AX and AY (indicative, respectively, of the actual displacement for the spindle Z, the table X and the saddle Y from reference positions) are provided through similarly identified cables to the computer C. Specifically, the computer C receives sets of digital signals (binary code words) AY, AX and AZ, indicative, respectively, of: the actual table position, the actual saddle position and the actual spindle position.

The signal-represented information indicative of actual positions of the machine-tool elements (signal sets AY, AX and AZ) is utilized in combination with various digital input signals IN (supplied through a cable from the manual input panel MR to the computer C) to develop signals that designate the desired positions for the elements in incremental steps. Specifically, signal sets DY, DX and DZ (developed in the computer C) indicate the final desired positions of the table X, the saddle Y and the spindle Z, respectively in a motion. The computer, as depicted in FIG. 1, considers the actual-position signals AY, AX and AZ and the desired final-position signals DY, DX and DZ, to accomplish specific interim analog command signals CX, CY and CZ.

The analog signals CX, CY and CZ are supplied to the machine tool unit T to command the incremental movements, respectively, of the table X, the saddle Y and the spindle Z. In the illustrative embodiment, the machine tool unit T includes hydraulic actuators that are controlled in accordance with the signals CY, CX and CZ to accomplish the desired motions, and in turn the desired machine cuts.

In addition to motion patterns by the machine tool unit T, several other operations may be performed. That is, some signal IN command signals CA which specify several auxiliary operations that are not directly related to motion patterns between the spindle Z and the workpiece W. For example, signals CA may be developed to command such functions as: changing the tool carried by the spindle Z, commanding changes in the type and timing of cutting fluid, specifying spindle direction-of-rotation, and so on. These operations may or may not require significant operation of the computer C, as considered in detail below.

Pursuing the operation of the system of FIG. 1 somewhat further, the operator (machinist) controls the machine tool unit T, by actuating switches (step-by-step) on the manual input panels MR and MD to accomplish signals IN that may be processed in the computer C to provide signals CX, CY, CZ and CA to specify the desired operations, as cuts in the workpiece W. As each geometric segment or segments and operation is performed, the propriety of the instruction is verified by checking the results of the physical cut or other operation that was made and the operator may then actuate the recording unit R to record signals representative of his instruction. Accordingly, the sequence of individual instructions that produce the desired machining of the workpiece W in a step-by-step fashion are formulated as a record.

Subsequently, during "automatic mode" operation, with very-limited attention from the operator, the recording unit R functioning as a reading unit provides digital signals to the computer C which again provides the command signals CX, CZ, CY and CA to drive the machine tool unit T through the previously defined sequence of operations required to effect the desired machining. It is to be noted that while the manual input panel MR is used primarily during recording, the manual input panel MD serves also to afford the operator continued and auxiliary control—primarily emergencies and overrides— of the machine tool unit T while under the control of the recording-reading unit R.

As indicated, numerical control of machine tools is well known in the prior art and is in widespread use. However, also as explained above, conventional numerical control systems have required the combined efforts of several specialists. With this invention, the sequence of events differs to a considerable extent. The trained machinist simply operates the machine tool unit T (through the controls afforded by the manual input panels MR and MD) to effect the desired machining of the workpiece W. The computer C functions not only to assist the machinist in effecting particular operations but also prepares a signal format which is recorded by the recording unit R, which subsequently controls the machine tool unit T.

Figure 2:
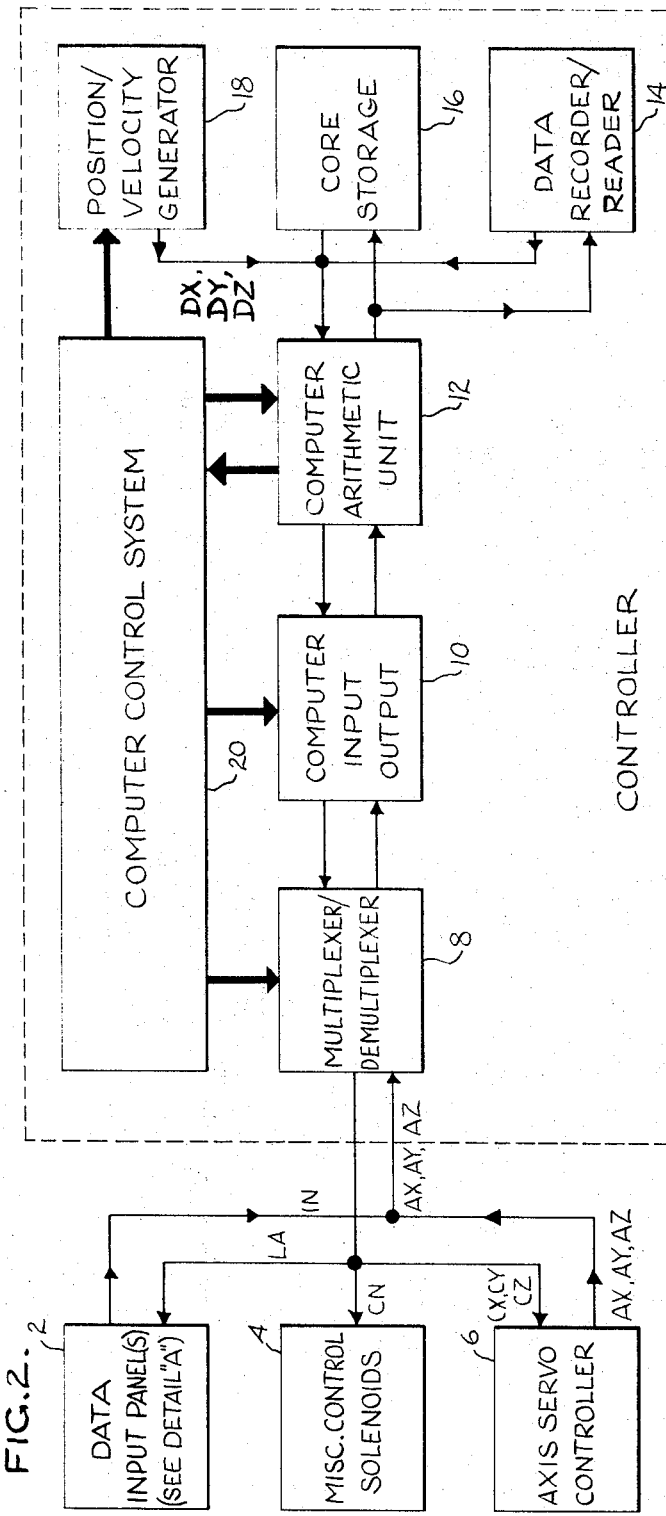
FIG. 2 is a block diagram of the system of FIG. 1, presenting elements in somewhat greater functional detail.
Figure 2A:
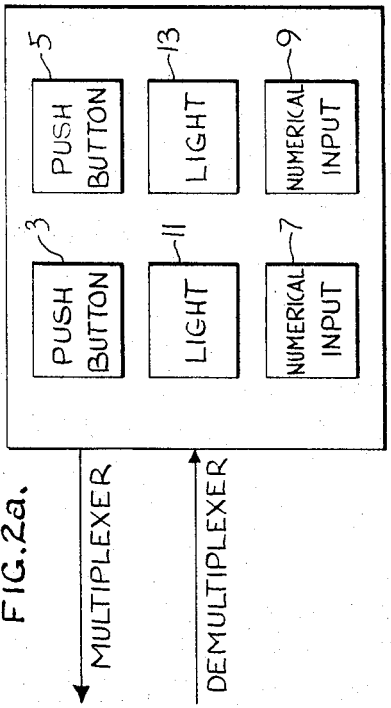
FIG. 2a is a front view of an exemplary structure embodied in the system as represented in FIG. 2.

Referring now to FIGS. 2 and 2a, the structural form of the illustrative embodiment will now be considered in somewhat greater detail with a somewhat-different division into functional blocks than described above. The data input panels MR and MD are represented by a single data block 2 (a typical portion of which is illustrated in FIG. 2a) which includes a pair of manually operated input push buttons 3 and 5, a pair of digital numerical-value input units 7 and 9 and a pair of indicating lights 11 and 13. Although only two push button units, two numerical input units and two indicating lights are illustrated representatively in FIG. 2a, such structures are repeatedly duplicated in the overall system as disclosed below.

A controller 22 (dashed line) which may comprise a general purpose computer along with a magnetic tape recorder-reader, is connected to receive the signal-represented data and commands from the manual input data block 2, i.e. signals IN. The control paths in the controller 22 are shown in heavy lines while data paths and data-control paths are shown as light lines. A bi-directional multiplexer 8 (within the controller 22) is connected to communicate between the various manual inputs (FIG. 2a), the controls, and the computing portion of the data controller 22, as well known in the art. Thus, the switch elements in the input data block 2 are continuously scanned through the multiplexer 8, under control of the computer control system 20. Accordingly, data is passed from the multiplexer 8 through an input-output unit 10 to the computer arithmetic unit 12 and to the core storage 16. In one case, for example, when the controller 22 receives signals IN, a miscellaneous operation may be commanded, e.g. reverse direction of spindle rotation. The signals are recorded in the core storage 16 and actuate the necessary control solenoids 4, returning a signal LA to illuminate a certain light, 11 or 13. Subsequently, the signal identifying the operation is transferred from the core storage 16 to a permanent record by the data recorder-reader 14.

If a motion, as by the table X, is commanded, a set of signals DX (desired table position) is developed. Signals AX (actual table position) are sensed by the generator 18. Then the difference between the positions represented by such signals on a linear scale is interpreted as a command to the axis servo-controller 6 which controls the machine tool unit T. Such commands are formulated as control signals CX to provide the desired movement, as for a machining operation.

The movement-commanding signals are developed from the original command as manually specified. In accordance herewith, the original command may be recorded, or developed signals may be recorded, depending upon the specific embodiment utilized.

After a machining operation has been satisfactorily completed, the assembled data in core storage 16 is transferred to the data recorder-reader 14 which may take the form of various serial recorders such as magnetic tape units, card punches, and so on. Thus, the data inputs from the panels 2 are processed, control the solenoids 4 and the servo-controller 6, and are representatively recorded by the recorder 14.

Figure 3:
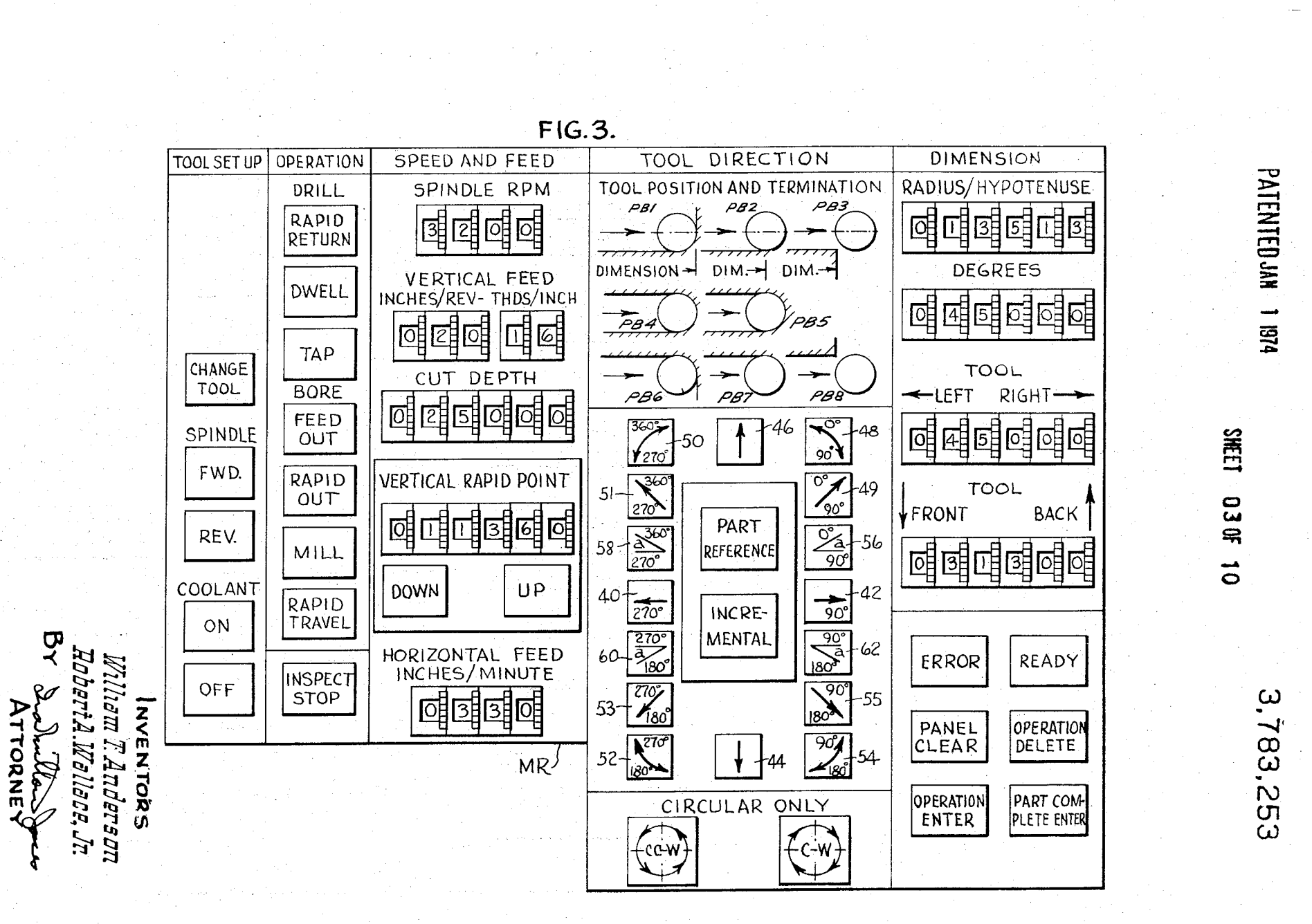
Figure 4:
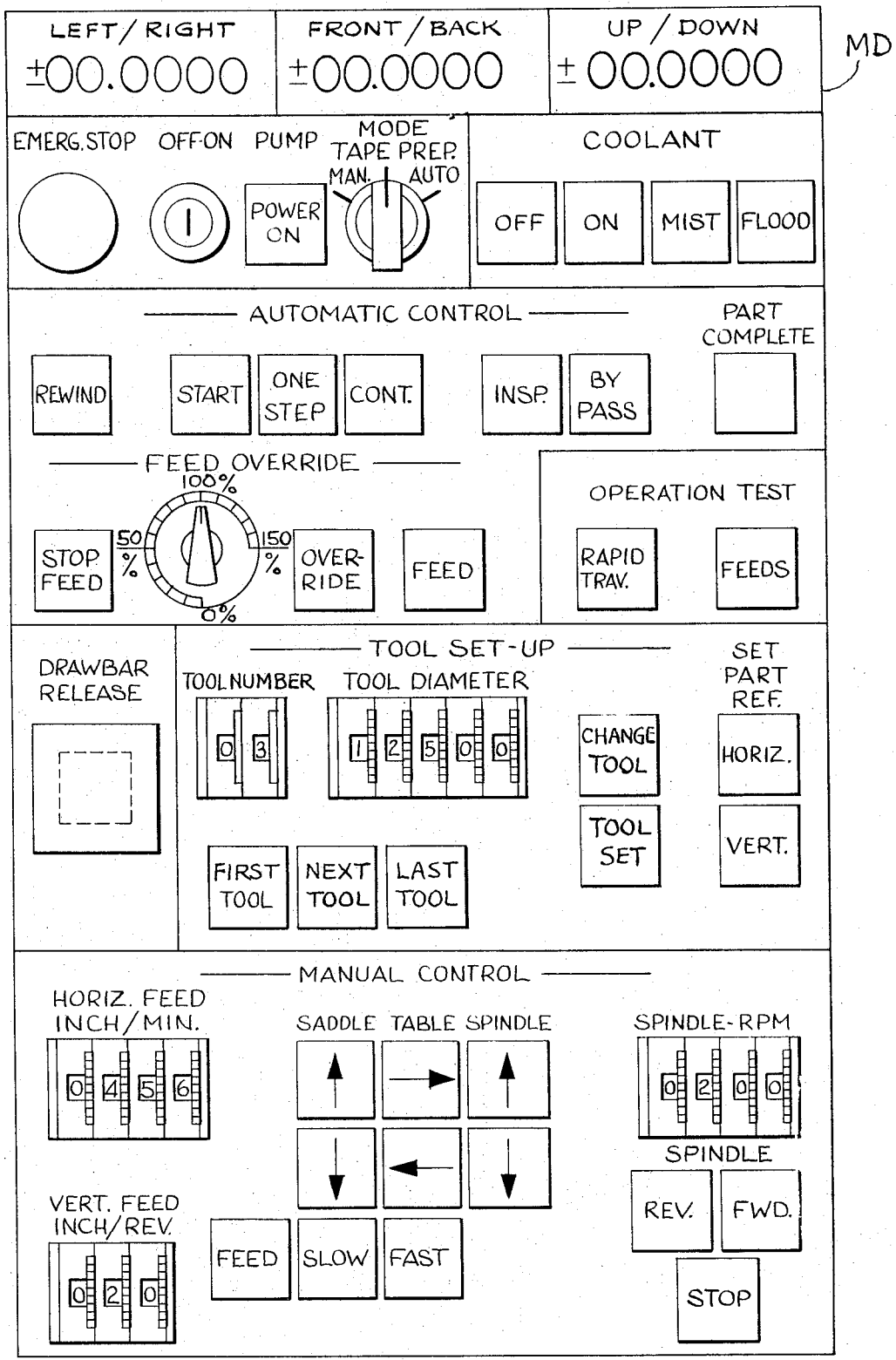
FIG. 4 is a front view of a control panel embodied in the system of FIG. 1, primarily for manual control apart from program development.

In FIGS. 2 and 2a, the manual controls are exemplified in an extremely simple form to facilitate presentation of the total system. In an operative embodiment hereof, the manual controls will normally be expanded substantially from those of FIGS. 2 and 2a. The manual controls for one operating embodiment, which has been found well-suited for use by machinists of ordinary skill, are shown in FIGS. 3 and 4. Specifically, FIG. 3 shows the front face of the data input panel MR (FIG. 1) while FIG. 4 shows panel MD. Generally, two types of manual-input controls are provided. Thumbwheel digital switches are employed to enter numerical data, and push button switches serve to enter single-state data e.g. command pulses and binary, trinary or other state data.

The thumbwheel switches as described herein may comprise rotary structures as well known in the prior art for indicating several stages of decimal numbers. The structure of the switches includes contacts for providing signals representative of indicated numbers, which signals may be provided as, or converted to binary digial form as well known in the art. Accordingly, signals provided from thumbwheel switches as designated below are to be understood to take the form of signal-represented binary digital code words.

The individual controls will now be considered and the signal representations provided therefrom will be identified. It is here noteworthy that the signal designations are summarized in a table concluding this description and are also indexed in alphabetical order along with all the other signals at the conclusion of this specification.

The first column of control switches as shown in FIG. 3 is labelled "TOOL SET-UP" as is the lower middle section of control panel MD shown in FIG. 4. Those portions of these control units which appear on both panels MR and MD have been omitted in FIG. 3 for simplicity. These units include thumbwheel switches designated "TOOL NUMBER" by which the different tools can be selected, and three push button switches designated, "FIRST TOOL," "NEXT TOOL" and "LAST TOOL" by which the appropriate tool change routine is selected, along with a push button switch labelled "CHANGE TOOL." These controls are used to command operation of a tool changer, which is part of the present invention only in a combination sense. A tool changer which may be used in embodiments hereof is disclosed in a copending application Ser. No. 163,267, filed July 16, 1971, invented by William T. Anderson, and assigned to the same assignee as the present application.

In the operation of the system each tool within an inventory is assigned a code number to enable selection of tools by actuation of the thumb wheel switch "TOOL NUMBER." The critical dimensions of the inventoried tools are registered in the system and are necessary for computing motion patterns as will be described hereinafter. The tool changer functions to change the tool in the spindle, on command, through the production of code signals. The code signal FT represents the first tool routine, the code signal NT represents the routine for the next tool and that of all succeeding tools except for the last tool which is represented by the code signal LT, and the code signal TN represents the selected tool. To accomplish a change in tools, the "CHANGE TOOL" switch is momentarily actuated, providing a signal CTN.

Below the tool changing controls of panel MR shown in FIG. 3, a spindle "FWD" switch and a spindle "REV" switch are provided to establish the tool rotation direction. These switches comprise a binary, the state of which is manifest by a pair of inverted binary signals SF and SR. Somewhat similarly, coolant "ON" and coolant "OFF" switches control the application of coolant to the workpiece, as for certain high-temperature machining operations. These switches also provide a binary, manifesting the inverted signals CN and CF.

In the column labelled "OPERATION" in FIG. 3, all seven switches are mutually exclusive. Three switches under "DRILL" and the four switches under "BORE" are provided to select one of seven possible operating states. Thus, these switches are a part of a septet defining seven binary signals, any one of which may exclusively command a selected operation. The "DRILL" operations include: rapid return, dwell and tap, represented respectively by the signals: RR, DW and TAP. The switches for selecting each of these states are labelled: "RAPID RETURN" and "DWELL" for drilling; and "TAP" for tapping. In drilling operations the selected choice will cause the drill either to: return from a finished hole; remain in the hole briefly before returning (to clear the hole of cuttings) and in tapping, there is no dwell, but instead an immediate reverse and return along the entry path to avoid injury to threads that were cut.

Two of the four switches in the same column under the designation "BORE" are "FEED-OUT" and "RAPID-OUT" which are used in controlling the Z motion of the spindle. Specifically in boring operations commands may be entered to cause the tool either to feed out along the entry path or to come out rapidly. This alternative is indicated by inverted binary signals FO and RO. In the same section, the switch labelled "MILL" is used to set the spindle for milling operations while the switch labelled "RAPID TRAVEL" serves to cause rapid traverse between the tool and workpiece. The signals associated with these switches are designated MLL and RT respectively. Another switch labelled "INSPECT STOP" is used to provide a signal DL for recording a command to cause the record-controlled operations to pause at preset points for inspection.

In that section of the panel MR (FIG. 3), labelled "SPEED AND FEED," a thumbwheel switch labelled "SPINDLE RPM" is used to specify the number of rotations per minute of the spindle. The numerical signal provided from the "SPINDLE RPM" thumbwheel switch is designated SS.

Also in the "SPEED AND FEED" section, a pair of thumbwheel switches labelled "VERT FEED IN/REV" and "THREADS/INCH" are used to set the vertical feed rate of the spindle in terms of inches per revolution or threads per inch. These switches, as indicated above, provide binary code signals representing commands which are designated VF and TI respectively.

A thumbwheel switch labelled "CUT DEPTH" provides code word signals CH which establish the depth to which the spindle-operated tool cuts the workpiece. An adjacent thumbwheel switch labelled "VERTICAL RAPID POINT" (forming a code word signal VR) and two associated switches "UP" and "DOWN" (binary signals TU and TD) are used to raise or lower, by the indicated amount, the threshhold elevation at which the spindle-operated tool ends and begins its rapid vertical feed. A thumbwheel switch labelled "HORIZONTAL FEED IN/MIN" provides code-word signals HF, used to control the rate of movement of the workpiece in the horizontal plane.

In the next column labelled "TOOL DIRECTION" there are eight push button switches PB1 through PB8, each representing the cutting tool and each having adjacent thereto a diagramatic illustration of position relationship between the tool and the workpiece. These push button switches, together with stored data on the diameter of the cutting tool in use, control the centerline position of the tool so as to position it either to the left or the right of the defined workpiece profile or for centerline geometry. These switches also control the stopping position of the tool centerline with respect to the desired workpiece profile, as for instance in traversing inside corners, tangents, and outside corners.

The mutually exclusive signals which result from actuation of the eight push button switches are respectively designated TLI, TLT, TLO, TCI, TCT, TRI, TRT and TRO.

Below the "TOOL POSITION" and "TOOL TERMINATION" diagrams are a number of push-button switches identified by reference numerals and labelled with arrows and symbols to indicate directions and coordinate motions, together with switches labelled "PART REFERENCE" and "INCREMENTAL." When the "PART REFERENCE" switch is depressed, signal PR is formed high to command that all measurements are taken from the original horizontal part reference point. However, when the "INCREMENTAL" switch is depressed, a negation signal IR is high, commanding all horizontal dimensions to be referenced to the last point from which measurements were taken.

The numbered switches include a tool left switch 40 (signal TL), a tool right switch 42 (signal TR), a tool front switch 44 (signal TF) and a tool back switch 46 (signal TB) to specify the direction of tool movement. A set of interspersed switches is marked with arrows to provide for arcuate control information in each of the rectangular-coordinate quadrants, including a first quadrant arcuate switch 48 (signal OQ), a second quadrant arcuate switch 50 (signal SQ), a third quadrant arcuate switch 52 (signal TQ) and a fourth quadrant arcuate switch 54 (signal FQ).

Another set of switches in the same panel section which are marked with arrows to provide for angular direction control signals, include a first quadrant angular switch 49 (signal OQ), a second quadrant angular switch 51 (signal SQ), a third quadrant angular switch 53 (signal TQ) and a fourth quadrant angular switch 55 (signal FQ). An angular direction control switch, when depressed, specifies the quadrant in which angular tool relative movement is to occur.

Still another set of switches numbered 56, 58, 60 and 62 provide for the entry of angular values in degrees in each of the four quadrants. Their signals are respectively OA, SA, TA and FA.

Below the arrow-indicating area, in a region labelled "CIRCULAR ONLY," are two switches labelled "CCW" (i.e. counter clockwise) and "CW" (i.e. clockwise). These switches are used to provide a pair of inverted binary signals CC and CW, which specify the direction of circular milling operations.

In the last column, labelled "DIMENSION," there are four numerical-input thumbwheel switches, respectively labelled "RADIUS/HYPOTENUSE," "DEGREES," "TOOL LEFT-RIGHT," and "TOOL FRONT-BACK." These thumbwheel switches are used to set in the digital code values of a movement specified for the tool in the directions indicated by the arrow-bearing switches as described above. The numerical values provided are manifest by signal sets: RH for radius, DG for degrees, LR for left or right and FB for front or back.

In the bottom portion of the last section of the panel, a light marked "ERROR" is provided for the computer to signal that some error has been made in entering data which makes the operation impossible to be carried out. An adjacent light marked "READY" is provided to signal that the system is ready to receive another data entry.

A switch marked "PANEL CLEAR" (signal PA) is depressed to clear the panel of all previous entries. A switch marked "OPERATION DELETE" (signal OD) is used to erase from core memory the record of the last operation carried out and to return the tool to its condition at the beginning of the deleted operation. A switch marked "OPERATION ENTER" (signal OE) is used to cause the record of the previous operation to be taken from core memory and recorded on tape by a data recorder 14 (FIG. 2). A switch labelled "PART COMPLETED" (signal PC) commands an entry to cause the data recorder (such as tape recorder) to return to its starting point.

Of course, various other miscellaneous controls may be provided and incorporated in the panel MR OF FIG. 3, as well known in the prior art. However, the operations and controls therefor as considered above clearly afford a basis which may be expanded to considerable lengths in various embodiments of the present invention, as will be readily apparent to those skilled in the art.

FIG. 4 illustrates the manual control panel MD for controlling the machine tool unit T manually. It is also used to: enter tool dimension data, perform manual test operations during the preparation of a data record, and initiate tape-controlled operation of the machine. During automatic operation of the machine, the manual control panel MD can be used to override and supplement recorded feed rate commands.

An "EMERGENCY STOP" switch (signal H) removes all power from the hydraulic power system, the control device, and from the laser interferometers used for distance measurement. It is the "panic button." The "OFF-ON" key switch supplies power to the control device and high-voltage power to the lasers. The "PUMP POWER ON" switch supplies electric power to the hydraulic power system. A three-position selector switch, indicating "MANUAL," "TAPE PREPARATION," and "AUTOMATIC" modes, controls the mode of operation of the system by providing command signals ML, TP and AU. In the "MANUAL" mode, the machine is controlled primarily from the panel MD of FIG. 4. In "TAPE PREPARATION" mode, the machine is basically controlled from the panel MR (FIG. 3) for the machining of a part and the preparation of a record (program) of machine instructions. In the "AUTOMATIC" mode, the machine is controlled from a combination of four sources, namely the permanent record, e.g. magnetic tape, variable data stored in the core memory of the computer, fixed sequence data in the computer control system, and override inputs from the manual panel MD.

The "COOLANT" switch panel section includes an "OFF" switch for turning the coolant off, and an "ON" switch for turning the coolant on independent of the tape recording, a "MIST" switch and a "FLOOD" switch for selecting the type of coolant flow.

The "REWIND" control (left) rewinds the control tape to the starting point, and causes energization of a signal light for the time during which the tape is rewinding. The adjacent "START" control, when depressed, causes the machine to begin a tape-controlled operation, and energizes a light during the performance of the operation. The "ONE STEP" control switch, when pressed, causes this recorded operation to be carried out one step at a time; the "CONT" control switch causes the operation to proceed continuously to perform all operations defined on the tape.

An "INSP" lamp indicates a potential inspection stop. The "BYPASS" switch, when pressed causes the system to ignore the recorded inspection stop code. The "PART COMPLETE" lamp, when on, indicates that the recorded program of operations has been completed. The "STOP FEED" switch, when pressed, immediately halts all three slide motions.

The "FEED OVERRIDE" control is used to supplement the recorded feed rate and causes the recorded feed rate to be changed by the percentage shown on the "FEED OVERRIDE PERCENT" control. The "FEED" control switch re-establishes the recorded feed program.

The two "OPERATION TEST" switches: "RAPID TRAVERSE" and "FEEDS" allow testing of operations which have been set up on the tape preparation panel.

The "DRAWBAR RELEASE" (left) switch functions only in the manual mode of operation and, when pressed, facilitates manual placement or removal of a tool in the spindle when the system is in certain modes.

The "TOOL SET-UP" sections of the panels are used to set up and store information concerning the various tools in the memory of the computer to allow automatic compensation for the length and radius of each tool. The "FIRST TOOL" switch in conjunction with the adjacent thumbwheel switch specifies the first tool to be placed in the spindle, the "NEXT TOOL" switch also in conjunction with the same thumbwheel switches specifies the tool to be removed from the tool changer and held in the tool ready position of the transfer mechanism of the tool changer, in which position the tool is close to the spindle so as to minimize the time required for the tool change, and the "LAST TOOL" switch in conjunction with the thumbwheel switch specifies the last tool to be used and also initiates the total machine "shut-down" procedure. The "TOOL DIAMETER" thumbwheel switches are used to identify the diameter of the tool placed in the spindle for use in radius off-set correction of cutting paths. The diameter information is only needed for milling cutters. The "CHANGE TOOL" switch is used to initiate the next tool change.

In the same section, the "TOOL SET" switch, along with the "SPINDLE UP" and "DOWN" switches in the MANUAL CONTROL section of the panel MR (FIG. 4), are used to enter into the memory of the computer the data concerning the length of a tool in the spindle. Actuation of the "TOOL SET" switch also enters the diameter of the tool, as specified by the "TOOL DIAMETER" switches into the core memory.

Under "SET PART REF" the "HORIZ" switch is used to relocate the "zero" of the machine measuring system to coincide with the starting point of the blueprint dimension of the workpiece; and to clear the back-front and left-right readout devices (shown at the top of FIG. 4) associated with the horizontal adjustment of the table. The "VERT" switch is similarly used to establish the vertical part reference point.

The "MANUAL CONTROL" section of the panel is operational only in the manual mode and allows manually controlled positioning and machining; accordingly, these controls along with many other controls that serve only to control the machine tool unit T are well known in the art, and are only ancillary to the basic system hereof. The "HORIZONTAL FEED INCH/MIN" thumbwheel switch defines the desired rate of movement (feed rate) in inches per minute. The "VERTICAL FEED INCH/REV" thumbwheel switch defines the desired vertical feed rate in inches per revolution. "SADDLE," "TABLE" and "SPINDLE" switches are provided to define axes and directions of travel. "Back" and "forward," "left" and "right," and "up" and "down" switches are provided and marked by arrows to effect movement in each of two directions on each of three axes. The "FEED" switch, when depressed, and held in conjunction with one of the aforesaid six recited controls, i.e. the saddle, table or spindle switches, causes movement of the table and/or spindle head at the preset feed rate. The "SLOW" switch, when pressed and held in conjunction with one of the six recited controls, causes movement of the table and/or spindle head at about one inch per minute. The "FAST" switch, when pressed and held in conjunction with one of the six recited controls, effects such movement at about 200 inches per minute. If any one of the six recited controls is pressed without also using the "FEED," "SLOW" or "FAST" controls, the movement is caused to jog in increments of 0.001 inch.

The "SPINDLE RPM" thumbwheel switches are used to preset the rotations per minute of the spindle in the "MANUAL" mode. The "FWD" switch, when pressed, causes the spindle to rotate in the forward (clockwise) direction at the preset spindle speed. The "REV" switch, when pressed, causes the spindle to rotate in the reverse direction at the preset speed. The "STOP" control, when pressed, stops the spindle rotation.

Actuation of the switches on panel MD, (FIG. 4) generally effects immediate response, e.g. movement of the table, saddle or spindle head. Conversely, the switches on the control panel MR are generally for the purpose of providing signals which: (1) command a machine operation and (2) can be recorded to duplicate the commanded machine operation. The control of machine tools, as well as a multitude of other mechanical structures, by switching devices is well known and in widespread use. Accordingly, the detailed description herein generally is limited to those components and sub-systems that are not well-known or readily apparent to persons skilled in the art. The detailed description is, therefore, primarily directed to the structures related to the control panel MR.

The switch structures as described above with reference to the panel MR (FIG. 3) incorporate digital signal apparatus. Specifically, the switch units include: (1) pulse or trigger devices to simply command a single operation or change of state (e.g. change tool); (2) multiple-state structures which uniquely specify one of a set of possibilities (e.g. coolant on or coolant off); and (3) numerical input switching devices (thumbwheel switches) which provide digital signals indicative of numerical values (e.g. spindle RPM).

It is to be noted that the signals provided from each of the various types of switching units are reduced to a binary code format, e.g. a single binary signal, or groups of binary bits (parallel, as eight) to be recorded and for specifying control of the machine tool. That is, generally, each element of intelligence provided from the switching panel which may be recorded, is reduced to a binary word which may be recorded in that form, as an element of an operating program and which is decoded to command an operation or instruction to the machine tool unit T, and/or the tool changer G.

A table of the command signals IN, formed by the switches and switching structures considered above is set forth below along with designations and the operations commanded. The signals are also classified by types either as: S1 (a command signal attained by a momentarily depressed button); S2 (two interrelated binary signals, a single one of which is invariably high, two command possibilities); S3 (a binary signal, which changes state or level upon each depression of a switch button); S4 (two binary signals providing three command possibilities—both off, one on, another on); S5 (trinary—three binary signals, each exclusive of the other with only one high at any time); S6 (four binary signals, whereby none or only one of which may be high at any time); S7 (command signals provided by a depressed button to select three-bit binary code word); S8 (command signal for three-bit code word, sustained after selection); S9 (code word representative of a number); and S10 (eight binary signals, whereby none or only one of which may be high at any time). Interrelated groups of signals are grouped together.

SIGNAL DESIGNATIONS

| SWITCH | SIGNAL | TYPE | OPERATION |
| --- | --- | --- | --- |
| Tool Number Switch | TN | S9 | Selects tools |
| First Tool | FT | S5 | Initiates first tool routine |
| Next Tool | NT | S5 | Initiates next tool routine |
| Last Tool | LT | S5 | Initiates last tool routine and total shut-down of machine |
| Change Tool | CTN | S1 | Commands the tool changer to change the tool in the spindle |
| Spindle-FWD | SF | S5 | Commands forward spindle rotation |
| Spindle-REV | SR | S5 | Commands reverse spindle direction |
| Coolant-ON | CN | S2 | Commands coolant |
| Coolant-OFF | CF | S2 | Halts coolant |
| Rapid Return | RR | S8 | Commands rapid withdrawal of drill from a hole |

| Name | Code | Type | Description |
|---|---|---|---|
| Dwell | DW | S8 | Commands a brief dwell time in a drilled hole |
| Tap | TAP | S8 | Commands reverse turning withdrawal from a hole |
| Feed Out | FO | S8 | Commands spindle to feed out along the entry path |
| Rapid Out | RO | S8 | Commands rapid tool withdrawal |
| Mill | MLL | S8 | Sets spindle for milling operations |
| Rapid Travel | RT | S8 | Commands rapid travel between spindle and workpiece |
| Inspect Stop | DL | S3 | Commands stopping point |
| Spindle RPM | SS | S9 | Spindle speed |
| Vertical Feed | VF | S9 | Vertical feed rate |
| Threads/Inch | TI | S9 | Threads specified per inch of vertical travel |
| Cut Depth | CH | S9 | Determines depth of cut |
| Vertical Rapid | VR | S9 | Change rapid traverse to feed threshhold |
| Up | TU | S4 | Rapid traverse feed threshhold up |
| Down | TD | S4 | Rapid traverse feed threshhold down |
| Horiz Feed | HF | S9 | Horizontal feed rate |
| Left Offset/Inside (PB1) | TLI | S10 | Commands tool travel on left side of work profile and terminates inside |
| Left Offset/Tangent (PB2) | TLT | S10 | Commands tool travel on left side of work profile and terminates tangent |
| Left Offset/Outside (PB3) | TLO | S10 | Commands tool travel on left side of work profile and terminates outside |
| Center Line/Inside (PB4) | TCI | S10 | Commands tool travel on its center line and terminates inside |
| Center Line/Outside (PB5) | TCT | S10 | Commands tool travel on its center line and terminates tangent. |
| Right Offset/Inside (PB6) | TRI | S10 | Commands tool travel on right side of work profile and terminates inside |
| Right Offset/Tangent (PB7) | TRT | S10 | Commands tool travel on right side of work profile and terminates tangent |
| Right Offset/Outside (PB8) | TRO | S10 | Commands tool travel on right side of work profile and terminates outside |
| Incremental | IR | S4 | Measurements from previous end point |
| Part Reference | PR | S4 | Measurements from starting point |
| Switch 40 | TL | S4 | Commands tool to move to left (per digital value) |
| Switch 42 | TR | S4 | Commands tool to move to right (per digital value) |
| Switch 44 | TF | S4 | Commands tool to move front (per digital value) |
| Switch 46 | TB | S4 | Commands tool to move back (per digital value) |
| Switch 48 and 49 | OQ | S6 | Commands radial or arcuate motion in first quadrant (per digital value) |
| Switch 50 and 51 | SQ | S6 | Commands radial or arcuate motion in second quadrant (per digital value) |
| Switch 52 and 53 | TQ | S6 | Commands radial or arcuate motion in third quadrant (per digital value) |
| Switch 54 and 55 | FQ | S6 | Commands radial or arcuate motion in fourth quadrant (per digital value) |
| Switch 56 | OA | S6 | Commands angular control (per digital value) in first quadrant |
| Switch 58 | SA | S6 | Commands angular control (per digital value) in second quadrant |
| Switch 60 | TA | S6 | Commands angular control (per digital value) in third quadrant |
| Switch 62 | FA | S6 | Commands angular control (per digital value) in fourth quadrant |
| CCW | CC | S7 | Commands counter-clockwise arc |
| CW | CW | S7 | Commands clockwise arc |
| Radius/HYP | RH | S9 | Radius of arc |
| Degrees | DG | S9 | Degrees of arc |
| Left-Right | LR | S9 | Extent of tool movement |
| Front-Back | FB | S9 | Extent of tool movement |
| Panel Clear | PA | S1 | Clears entire MR panel |
| Operation Delete | OD | S7 | Cancels entries before recording and returns to directly previous condition |
| Operation Enter | OE | S7 | Commands recording and resets tool direction portion of MR panel |
| Part Completed | PC | S7 | Commands end of recording and rewinds tape to starting point |
| Emergency Stop | H | S1 | Halts all operation |
| Manual | ML | S5 | Commands manual operation |
| Tape Preparation | TP | S5 | Commands tape prepare operation |
| Automatic | AU | S5 | Commands automatic operation |
| Tool Diameter | DI | S9 | Specifies tool diameter |

Some examples of specific consideration will completely explain the format of signals as identified in the above chart. As indicated, the push-button switch commanding a change of tool "CHANGE TOOL" produces a signal CTN which may be classified as S1 because it merely commands a simple operation by the machine tool unit T. Of course, it is to be appreciated that various signals are registered to be incorporated in a recorded program; however, insofar as control operations are concerned these signals simply command a change.

The switches "COOLANT ON" and "COOLANT OFF" are employed to provide the binary signals CN and CF (type S2) respectively, one of which is invariably high while the other is low. Thus, the two signals may be considered a true binary signal and its negation. If the signal CN is high, the signal CF is low.

The numeric signals (S9) each comprise a set of binary signals (a binary word) which is indicative of a numerical value. Accordingly, in a decimal format, each decimal stage may be represented, for example, by eight alpha-numeric binary digits, as well known in the prior art. Such signals may take many binary forms.

Reference will now be made to FIG. 5 which is an expanded presentation of the structure shown preliminarily in FIG. 1. In view of the somewhat different presentation and distinction between system elements, fresh identification numerals are applied to the components of the system of FIG. 5. In that regard, note that the computer unit 120 (FIG. 5) is a distinctly different functional unit than the computer C (FIG. 1) or the controller 22 (FIG. 2).

The manual switch structures for producing the signals identified in the above chart are embodied within a block 112 (FIG. 5) designated "switch structures." During tape-preparation mode (TP high) the switch elements in block 112 are interrogated or scanned by a multiplex unit 114 (through a cable 115) which may take a wide variety of different forms as well knwon in the prior art or may be a programmed general purpose unit. Functionally, the multiplex unit 114 supplies signals indicative of the intelligence represented by the switch structures 112 (in an organized form) to a code generator 116 through a cable 118. The code generator 116 then provides a unique binary word for each of the data elements as represented by the signals above, providing numerical representations in the same format through lines L1–L8. Specifically, for example, the signal CT may be represented by an eight-bit binary word: 00000001. As another example, the binary interrelated signals SF and SR may be represented by the binary words: 00000111 and 00000011, respectively. Of course, the number of individual signals provided in the system may be expanded dramatically from those disclosed herein which are merely exemplary, and any of a wide variety of code words can be used as will be apparent to those skilled in the art.

In addition to digitizing the various command signals, numeric signals (provided by the thumb switches) are also resolved into code-word format by the code generator 116. Note that the generator may be a programmed unit or hard wired as well known in the prior art. In this structure, any of a variety of well-known binary digital code formats may be utilized. For example, a format as set forth below may be adopted to accommodate a substantial number of commands as well as numerical values which are pertinent to such commands.

| SIGNALS | L8L7L6L5L4L3L2L1 (Digital code) |
|---|---|
| CT | 0 0 0 0 0 0 0 1 |
| SF | 0 0 0 0 0 1 1 |
| SR | 0 0 0 0 0 1 1 1 |
| CN | 0 0 0 0 0 1 0 1 |
| CO | 0 0 0 0 0 0 1 0 |
| NUMBERS | |
| 1 | 1 0 0 0 0 0 0 1 |
| 2 | 1 0 0 0 0 0 1 0 |
| 3 | 1 0 0 0 0 0 1 1 |

In the illustrative system, the code generator 116 provides binary-code output signals to eight parallel lines, L1, L2, L3, L4, L5, L6, L7 and L8, which lines carry similarly identified binary signals that are provided to: a computer unit 120, a temporary storage unit 122 and a decoding matrix 124. The lines L1, L2, L3, L4, L5, L6, L7 and L8 essentially comprise busses for transferring the individual signal-represented code words that formulate the program of operations. Accordingly, these lines are also connected to receive output signals from a recording-reading unit 126 for operation during automatic control, when the signal AU is high.

Recapitulating and considering the system in general, the code generator 116 provides binary words during the development of a program signal (TP high) which words are initially contained in the temporary storage unit 122, which may comprise a magnetic-core memory. Somewhat concurrently, the signal-represented binary code words are applied to the decoding matrix 124. If a non-motion operation is commanded, the output signal CA from the matrix 124 is supplied through a cable 128 to a machine tool unit 130. Upon confirmation that the code-word signal CA commands the desired machine-tool function, a signal OE is manually provided and the binary word is transferred from the temporary storage unit 122, through a compound "and" gate 131 to be recorded by the recording unit 126 as an element of the automatic-control program.

If, distinct from the above situation, the code word manifest by the signals L1 – L8 specifies a motion or an adjustment, numeric values follow which are also manifest by code words of signals L1 – L8. These sets of signals are rejected by the decoding matrix 124, in favor of the computer unit 120. Such sets of signals provide raw data to the computer unit 120, from which specific command signals IX, IY and IZ (defining incremental positions) are derived and supplied through cables 132, 134 and 136 to actuate motions in the machine tool unit 130. Such computations are described in greater detail below. However, again, providing the code words that command the motions prove to be as desired, they are transferred from the temporary storage unit 122 to the recording unit 126 through the gate 131.

Still, considering the system very generally, during automatic operation (AU high) the recording unit 126 provides the code-word signals on the lines L1, L2, L3, L4, L5, L6, L7 and L8 to produce input commands for the computer 120 and the decoding matrix 124 just as described above. Accordingly, the decoding matrix 124 actuates various command operations by the machine tool 130 while the computer 120 provides control signals IZ, IX and IY through cables 132, 134 and 136 to control, respectively, a drive/measurement spindle unit 138, a table drive/measurement unit 140 and a saddle drive/measurement unit 142. As indicated, these units are connected, respectively, to the spindle Z, the table X and the saddle Y. Thus, the computer unit 120 provides signals to the drive units which produce incremental linear motions of the three-dimensional milling components (spindle, table and saddle). When the motion is complete, the drive/measurement units so indicate by signals MC supplied to the computer.

The computer unit 120 develops sets of signals IX, IY and IZ indicative of each next desired position for each of the machine elements. Thus, incremental movements attain desired paths. Specifically, for example, the computer unit 120 develops binary representations (signals IZ, IX and IY) indicative of the next incremental position for each of: the spindle Z, the table X and the saddle Y. Such signals are provided to the drive units 138, 142 and 140, which include means for sensing the instant or actual position of each of these elements in the form of signal representations AZ, AX and AY. The drive units compare the next incremental positions with the actual positions and accordingly control the movement of the machine tool members to attain coincidence, i.e. desired incremental positions to coincide with actual position.

It is to be noted that in the system a dimensional difference must be recognized between the cutting edge of a tool employed in a profiling mode and the axial center of the tool. For example, such a tool will have a cutting edge at its tangent; however, computation and control herein is basically directed to tool axis. Accordingly, as described in detail below provision must be made for this radial offset.

An understanding of the system may now best be advanced by assuming a stage and considering certain exemplary operations, initially during the tape-preparation mode and subsequently during the automatic-control mode. Accordingly, assume that an operator is machining a workpiece and recording the individual operations of the process to provide a program. Assume further that the process has reached a stage at which a tool change is required. Consequently, the operator actuates the "CHANGE TOOL" switch to formulate a signal CTN as a pulse which is applied to the code generator 116 through the multiplex unit 114. The code generator 116 then provides a digital code word, e.g. 00000001 which is temporarily stored in the unit 122 and is decoded by the matrix 124 to provide a signal in one line of the cable 128, commanding the machine tool unit 130 to change the tool.

Upon completion of the tool change operation (described in detail in the aforesaid co-pending Anderson application) the operator may next actuate the "OPERATION ENTER" switch to produce the signal OE which qualifies the compound "and" gate 131 to record the binary-word digits L1 – L8 on a permanent record by transferring it from the temporary storage unit 122 to the recording/reading unit 126.

Continuing, assume next that the operator desires to set the machine tool unit 130 so that the spindle Z will revolve in the "forward" direction. Accordingly, he depresses the switch "SPINDLE-FWD" (FIG. 3) to formulate the binary signal SF high. Thereupon, such a signal is supplied for digital coding by the generator 116 and passed as a similarly identified code word to the temporary storage unit 122. Concurrently, the decoding matrix 124 decodes the binary word (e.g. 00000011) to actuate the machine tool unit 130 (through cable 128) to set the direction-of-rotation for the spindle Z at "forward." Subsequently, the operator again performs the switching operation to command the entry of the binary word as a permanent record by operation of the recording/reading unit 126.

Assume next, for example, that the operator desires to command an actual movement of the machine tool unit elements to accomplish a particular operation. Accordingly, the switch structures 112 are actuated to provide instructions for the operation. For example, the operator might depress left offset/inside switch PB1 formulating the signal TLI, the binary equivalent word for which is placed in the computer 120 and the temporary storage unit 122. Such an operation is not decoded by the matrix 124 as it does not specify a simple machine tool instruction for the unit 130.

The operator may also actuate other of the switch structures 112 to command a particular motion pattern. Such commands are also reduced to binary code words (L1 – L8) and placed in the computer 120 and the storage unit 122. Finally, the operator specifes the blueprint dimension as a numerical value, which information also is coded as number-representing binary words L1 – L8 that are also placed in the computer 120 and the temporary storage unit 122.

Upon receiving the complete information for determining the path to the next end terminal position of the machine-tool elements, the computer 120 performs the requisite computations and provides a series of signal-represented code words to the drive units. The code words are indicative of the incremental positions for each of the elements (spindle, saddle, table) along the paths for the cut. The code-word signals provided include signals IX, IY, IZ, VX, VY and VZ. The signals IX, IY and IZ appear as a repeated series and define incremental motions to positions along the desired path of travel. The signals VX, VY and VZ specify the velocity of travel.

Again, upon completion of the cut to confirm the propriety of the commands (switch closures) the signals representing the commands are transferred from the temporary storage unit 122 to a permanent record by the recording unit 126. Thus, an entire program is developed instruction-by-instruction. The individual instructions are tested for confirmation and the operator sees a physical form of the product. In the operation of the system, the computer unit 120 develops a sequence of distinct binary timing signals TS, TBC, TE, TC1 and TC2.

The address sequence 125 generates address codes represented by signals ADDR, which are connected for application to: the multiplex unit 114, the code generator 116, the computer unit 120, the temporary storage unit 122, the decoding matrix 124 and the recording unit 126. The signal ADDR facilitates the multiplexing (or de-multiplexing) of the information transferred through the lines L1 – L8.

While the signal TS is in a high state, an interval is manifest during which the system is ready to receive the next manual command from the switch structures 112. During the interval of timing signal TBC, the computer unit 120 senses the code word from the generator 116 to be either: (1) a simple, non-computing command, e.g. reverse direction of spindle rotation or (2) a command requiring computation e.g. indicative of a movement for a cut. If a simple operation is commanded, it is executed during the interval of the signal TBC. If a complex command occurs, the signal TBC endures until the computer unit 120 has all the necessary data for computation. At that time, the signal TC1 becomes high and computation occurs. That is, the signal TC1 is provided from the computer unit 120 during an interval while a computation is in progress to derive the first incremental values of code words IX, IY and IZ. The interval defined by signal TE (concluded by the motion complete signal MC) allows the system to attain values indicated by the signals IX, IY and IZ.

After the execution interval defined by the signal TE, the computer unit 120 either indicates the operation is complete (signal TS) or performs another cycle of computation, as to develop another signal IX. Computation periods after the initial period are manifest by the signal TC2 being in a high state.

Of course, the computer unit 120 may vary in complexity depending upon the number and detailed nature of the computations which are to be accomplished. However, exemplary operations and component means for the computer unit 120 are set forth herein to illustrate both linear and non-linear relative movements between the workpiece and the spindle.

After the preparation of a recording (magnetic tape or the like) of the machining program, it may be utilized to form duplicate workpieces with the system in an automatic mode (signal AU). During such a state, the recording unit 126 provides the binary code words (digits L1, L2, L3, L4, L5, L6, L7 and L8) during the interval of signal TBC for application to the computer 120 and to the coding matrix 124 to control the machine tool unit 130 and the tool changer 144 just as previously described. Of course, the system may be repeatedly used in the automatic mode (numerical-control) to generate a large number of duplicate workpieces.

Considering the individual units as shown in FIG. 5, various specific structures may be utilized. The multiplex unit 114, as indicated above, may take the form of any of a wide variety of different structures or programs including a rotary-format sequence scanner as well known in the prior art (see COMPUTER ORGANIZATION Flores, 1969, pp. 57. Also, multiplex programs for small general purpose computers are well known in the art.

The code generator 116 may comprise a diode matrix constructed to reflect the particular code format that is utilized as disclosed beginning at page 10 of a book entitled COMPUTER ORGANIZATION by Ivan Flores (Prentice-Hall 1969). Essentially, a particular signal or signals on a conductor or set of conductors in the cable 118 results in the development of a unique combination of binary signals in the lines L1, L2, L3, L4, L5, L6, L7 and L8 to manifest a particular binary code word. Any of a variety of code formats may be adopted and programmed or hard wired.

The decoding matrix 124 may comprise a structure also as described in the referenced book COMPUTER ORGANIZATION, which structure is somewhat the inverse of the code generator 116. Various structures utilizing diode logic elements and operating programs to perform the function are well known in the prior art. Those operations of the machine tool unit 130 which involve a simple change in state (condition or the like) are accomplished by the application of a signal to individual conductors in the cable 128 in accordance with the command code received by the matrix 124. Such operations include actuating the tool changer 144 setting a relay (not shown) to establish a directional rotation for the spindle Z and so on.

The temporary storage unit 122 may comprise a core memory as well known in the prior art and may include logic for operation as a "first-in first-out" list memory. Accordingly, code words delivered from the unit 122 through the compound gate 130 are recorded in sequence by the recording unit 126 which, again, may comprise any of a wide variety of different recording units including a magnetic tape unit, a paper punch tape unit, a card unit and so on.

The computer unit 120 may take the form of a small, general-purpose computer several of which are readily available (see COMPUTER ORGANIZATION - Flores, 1969, pp. 112). Alternatively, a special-purpose system may be utilized. In any event, certain details of the computer unit 120 are considered below.

The drive/measuring units 138, 140 and 142 each may be of similar structure and may take an exemplary form as will now be considered in detail. Reviewing functions, these units receive a signal (IX, IY, or IZ) representing a binary code word which indicates the next incremental position for the element under control. Specifically, for example, the table drive/measuring unit 140 receives a digital code word (signal IX) which indicates the next desired incremental-step position for the table.

The table drive/measuring unit 140 incorporates structure for sensing the instant or actual position of the table (along the X axis) in the form of a digital signal AX which is then supplied to the "AXIS SERVO CONTROLLER 6" (FIG. 2) where it is compared with the desired position, indicated by digital signal IX and develops a control signal CX in analog form which controls an actuator by which the table is moved.

Reference will now be had to FIG. 6 showing the details of the table drive unit 140, the description of which is applicable to each of the drive units.

FIG. 6 illustrates the drive unit sub-system for controlling relative movement of the table along the X axis. The binary code word (signal AX) indicative of the actual position of the table is provided from a position sensor, in this case a laser interferometer 170 (upper left). The interferometer senses increments of movement along the X axis and supplies fringe count pulses to an interference fringe to inch (or metric) converter 171 that in turn supplies pulses representing the assigned inch valve (or metric) to pulse counter 172, the contents of which (signal AX) manifests the actual position of the table as a binary code word.

In one form of the present invention, the center position of the table is represented as a binary zero with displacement from that position in either direction represented by signed numerical values. Although various forms of position sensors are well known in the prior art, a system which may be employed as the interferometer 170 and counter 172 is disclosed in the Gene A. Butts, U.S. Pat. No. 3,574,292 which is assigned to the assignee of this application.

The digital representation for the actual position of the table (signal AX) as accumulated in the counter 172 is applied to one input of a digital adder 174. The other input to the digital adder 174 is developed from an output of the computer unit 120 (FIG. 5). Specifically, the binary code signals IX (identifying the next incremental position for the table on the X axis) is supplied from a buffer source, as designated by a block 176, to a digital buffer register 178. The contents of the register 178 are supplied to the digital adder 174 through a complementing circuit 180 whereby the digital adder 174 actually accomplishes an arithmetic subtraction, as well known in the computer art. Structures involving adders and complementing circuits to accomplish digital subtraction are shown and described in a book entitled ARITHMETIC OPERATIONS IN DIGITAL COMPUTERS, by R. K. Richards (Van Nostrand) as well as THE LOGIC OF COMPUTER ARITHMETIC by Ivan Flores (Prentice-Hall Inc.).

As indicated, the values represented by signals AX and IX may be either positive or negative so that their difference may also be positive or negative, indicating a desired distance or displacement along the X axis. The digital differential value ($\Delta X$) indicates the requisite X-component of motion which must occur to attain the next desired position along the X axis. The sign digit of the binary-code representation of signal $\Delta X$ is applied to a direction circuit 184 and the number digits are applied to a digital-to-analog converter 186. The direction circuit 184 is sensitive to the sign digit to supply direction control as described below.

The converter 186 provides the magnitude of the differential signal $\Delta X$ in an analog form, i.e. signal CX. Recapitulating, the analog signal CX indicates the requisite displacement along the X axis to accomplish the next-desired incremental position for the table. The binary sign-digit signal from the direction circuit 184 manifests the direction of movement to attain the next incremental position. As described in detail below, these signals afford control of the drive system employed to effect the commanded incremental motion, and which for illustration may be a hydraulic system as shown in FIG. 6.

The converter 186 is also connected to a null detector 187 which provides the binary output signal MC with a high-level indicating movement which is complete when the converter 186 attains a null. Accordingly, when the signal CX nulls to zero, a high-level binary signal MC is supplied from the null detector 187 to the computer unit 120 (FIG. 5) to indicate readiness for another signal IX.

The computer unit 120 (FIG. 5) in addition to providing the binary words manifest by signal IX (indicating the desired next table position) also provides signal VX representing code words which manifest the feed rate or velocity of the table movement. Similar signals VY and VZ are provided in a similar manner. The signal VX, representative of the velocity code word is supplied from the computer unit through a buffer block 188 to a digital buffer register 190 which is in turn connected through a digital-to-analog converter 192 to an analog driver 194. The output from the converter 192 is an analog signal AVX manifesting the velocity desired for the movement indicated by the analog signal CX. The analog driver 194 receives the signal CX and modulates the value thereof as an output in accordance with the amplitude of the signal AVX. The analog driver 194 may comprise various forms of operational amplifier circuits.

The output from the analog driver 194 is an adjusted form of the analog signal CX which represents the actual drive signal for the table. This signal may be further modified by an analog summing circuit 196 which is connected to receive a manual control signal from a potentiometer 198. Accordingly, manual override control is introduced for adjusting the table feed rate to produce the final control signal that is supplied to a switch circuit 199.

The function of the switch circuit 199 is to supply the final analog control signal CX to one of the output conductors 201 or 202 depending upon the state of the binary sign signal received in the conductor 204 from the direction circuit 184. Specifically, if the binary signal in the line 204 is high, the control signal CX is supplied to the conductor 201. On the contrary, if the binary sign signal is in a low state, the control signal CX is supplied to the line 202. Thus, the circuit may simply comprise a pair of "and" gates as well known in the art.

The signals +CX and —CX supplied respectively through the lines 201 and 202 are received by hydraulic valve units 206 and 208. These structures may comprise hydraulic flapper or control valves as well known in the prior art and as shown, for example, in U.S. Pat. No. 3,258,025 for controlling the displacement of hydraulic actuator 210 which is connected to drive the table as indicated. The hydraulic actuator 210 is connected to the valve units 206 and 208 by hydraulic lines 212 and 214 as indicated. Accordingly, signals appearing in the lines 201 and 202 accomplish the displacement of the table to the desired next position.

As to the hydraulic actuator 210 moves the table, the displacement is sensed by the laser interferometer 170 as indicated by the dashed line between unit 170 and Table X. Accordingly, the contents of the counter 172 approaches the content of the register 178. Thus, during the internally clocked operation, as the value AX approaches the value IX, the control signal CX decreases to approach zero. When zero is attained, the null detector 187 provides a reset signal (as shown in FIG. 6) and a signal MC to the computer unit 120 (FIG. 5) to initiate the next geometric segment.

Figure 7:
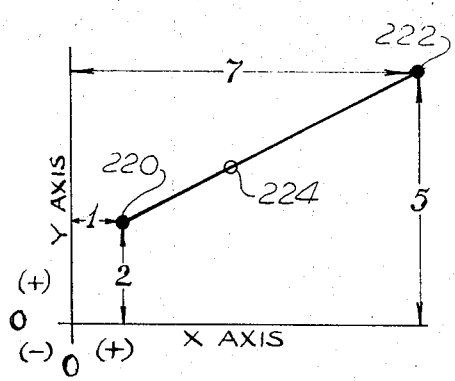
FIG. 7 is a rectangular-coordinate diagram illustrative of an operation of the system as represented in FIG. 5.
Figure 7A:
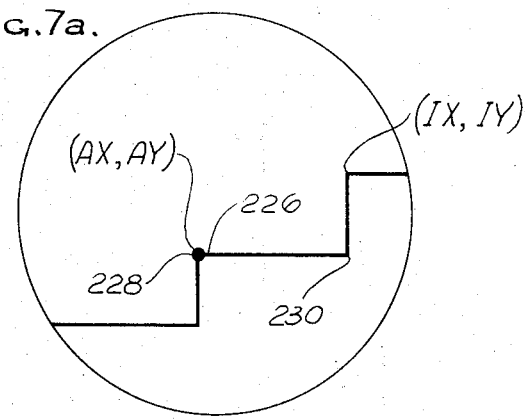
FIG. 7a is an enlarged fragment of the diagram of FIG. 7.

The compound operation of two of the drive units (FIG. 5) as shown in detail in FIG. 6 is illustrated by an analytical consideration as presented in FIGS. 7 and 7a. Assume, for example, that the desired relative movement for the table is from a position of X = +1 to a position of X = +7 with an attendant displacement by the saddle from Y = +2 to Y = +5. As illustrated in FIG. 7 the desired relative movement is from starting point 220 to a end point 222. This path is described incrementally by the dimension-predicting calculations of the system disclosed herein. Specifically, the path is provided between the point 220 and the point 222 (FIG. 7) in incrementally small steps. The steps are so small that the actual cutting operation occurs essentially as a straight line. The circle 224 (FIG. 7) is enlarged in FIG. 7a and indicates the step function 226 which actually commands the motion patterns. Of course, the components of the motion pattern may be executed concurrently or in sequence. Consequently, the actual pattern of motion may or may not resemble a step function in minute analysis.

In the operation of the drive units (FIG. 5) as described in detail above with reference to FIG. 6, when the relationship of the workpiece to the spindle is at the point 228 (FIG. 7a) the digital register 178 (FIG. 6) receives a value of IX to designate the X-component of the point 230 as the next desired positional relationship. Thus, the digital register 178 receives a series of interim values IX which define the incremental motions of the system to attain the eventual desired positional relationship. Of course, the increments of motion for the saddle (Y-component) are similar. It is to be noted that the individual component motions bear the same relationship to each other as the total displacements.

The development of the incremental position signals, manifesting code words IX, IY and IZ are provided from the computer unit 120 (FIG. 5) and are developed incrementally during the timing sequence as explained above. Specifically, during the timing signals TC1 and TC2, the computed values of the signals IX and IY (defining next incremental positions) are proportionally related to the ultimate displacement of the instant path. The linear information definitive of the desired displacement may be variously provided. These computations may be accomplished by the use of structures and trigonometric programs as well known in the prior art. Such structures are provided in a component resolver 250 (FIG. 8) which receives inputs from the various switches and which unit is embodied in the computer unit 120 (FIG. 5). In that regard, for example, specific reference is made to U.S. Pat. No. 3,247,365 (Bell et al.) DIGITAL FUNCTION GENERATOR INCLUDING SIMULTANEOUS MULTIPLICATION AND DIVISION; U.S. Pat. No. 3,412,240 (Hunt et al.) LINEAR INTERPOLATOR; and U.S. Pat. No. 3,459,926 (Heilweil et al.) GRAPHIC VECTOR GENERATOR.

The component resolver 250 computes the preliminary incremental values, PIX and PIY. In the profiling mode the incremental values PIX and PIY are supplemented with tool radius information thereby producing signal values TOX and TOY.

Considering the analytical case of FIG. 7, it is apparent that the slope of the path (ratio of X-component to Y-component) is one-half. Accordingly, the incremental motions along the X-axis are double those along the Y-axis. Specifically, the initial value of PIX is the actual value (AX) plus an increment related to increments in the value of PIY by a factor of two. Thus, PIX = 1 + 2IK, where IK is the increment constant. The initial value of PIY = 2 + IK.

It is to be noted that the path or vector of a cut, as depicted in FIG. 7 may be variously specified by the input signals IN. Trigonometric routines are well known for computing the values as represented by signals PIX and PIY.

The incremental positional values PIX and PIY, as manifest by binary code words are supplied to an X-component arithmetic unit 254 and a Y-component arithmetic unit 256. A correction unit 252 is connected to the resolver 250 and to the tool radius register 258 which is loaded, as explained above, during the preliminary setup operations. The correction unit 252 derives digital signals representative of values TOX and TOY, which signals are supplied to the arithmetic units 254 and 256, respectively, to be additively or subtractively combined with the values PIX and PIY for the formulation of the values IX and IY when the cutter is used for profiling. The arithmetic units 254 and 256 may comprise simple arithmetic units as disclosed in the book, THE LOGIC OF COMPUTER ARITHMETIC - Flores, beginning at page 120.

Figure 8:
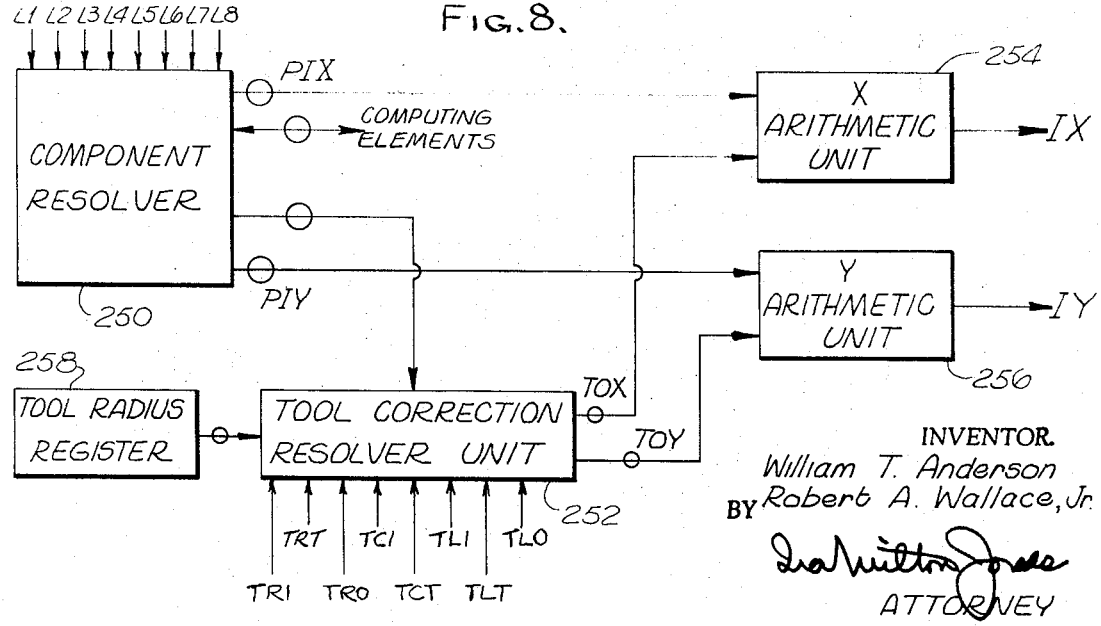
FIG. 8 is a block diagram of another component part of the system as represented in FIG. 5.
Figure 9:
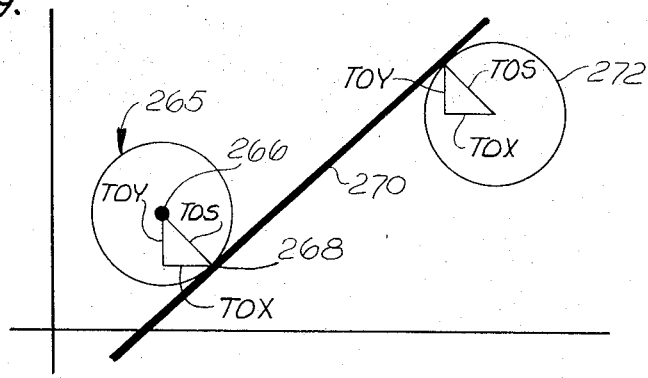
FIG. 9 is a rectangular-coordinate diagram illustrative of another operation of the system as represented in FIG. 5.

An analytical presentation of the operation of the structure of FIG. 8 is provided in FIG. 9. Assume that a cut is to be accomplished by a tool as represented in cross section by a circle 265. The computations for the path of the tool would normally be directed to the tool center 266; however, cutting actually occurs along the tangent 268 defining a path 270. Consequently, a distance TOS of tool offset must be resolved into coordinate component values TOY and TOX to displace the center 266 (basis of calculations) from the cutting-edge tangent 268. If the cut is to be made by the tool indicated by the circle 265, the distance represented by the value TOY must be added while the distance TOX must be subtracted.

Considering another circle 272, representative of a tool in cross section, it may be seen that to define a cut as indicated by the line 270, the distance value TOY must be subtracted while the distance value TOX is to be added. The treatment of the component values TOX and TOY depends upon the position of the tool with reference to the workpiece as indicated by the offset signals TRI, TRT, TRO, TLI, TLT and TLO. Thus, the arithmetic units 254 and 256 (FIG. 8) receive information in the form of signals and accordingly, when required, control the addition or subtraction of the values TOX and TOY to adjust the values PIX and PIY to accomplish the actual incremental control values IX and IY.

The operation of the component resolver 250 (FIG. 8) to accomplish linear-motion commands as explained above involves simply proportionizing the component displacements to attain values for incremental operation. However, the development of incremental values for commanding arcuate or circular paths is somewhat more complex. In general, the operation of the system to command arcuate motions involves the solution of trigonometric functions by a process of digital integration. It is well known, that trigonometric functions can be expressed as the solutions of the simple harmonic differential equation:

$$d^2Y/dX^2 = -Y.$$

In general, the solution of the above differential equation to provide trigonometric functions may involve the use of two integrators. A detailed disclosure of the solution using digital integration is set forth in U.S. Pat. No. 2,841,328 issued July 1, 1958. In accordance with the system hereof, the signals PIX and PIY for arcuate paths are developed in an incremental fashion. Specifically, PIX (present value) is incremented to provide its next value. Signal represented values of PIY are similarly developed. Accordingly, the non-linear incrementing (or decrementing) of the last values produces a series of values to define a circular arc. The development of the increments or decrements involves an arrangement of digital integrators wherein both increments in values of X and Y are variable.

The development of the next incremental position as defined by the signals is in accordance with the following equations:

$$CIY_{n+1} = CIY_n - D(CIX)_n$$
$$CIX_{n+1} = CIX_n + D(CIY)_{n+1}$$

wherein:
$CIY_{n+1}$ is equivalent to new Y axis position
$CIY_n$ is equivalent to present Y axis position
$CIX_{n+1}$ is equivalent to new X axis position
$CIX_n$ is equivalent to present X axis position
$-D$ is equivalent to a fractional constant, during counterclockwise motion, of $2^{-16}$.
$+D$ is equivalent to a fractional constant, during clockwise motion of $2^{-16}$.

The signals CIY and CIX define values that are related to the values of PIX and PIY. However, while the values manifest by signals PIX AND PIY are referenced to the rectangular coordinates of the system, the values represented by the signals CIX and CIY are referenced to the center of the circular path being developed. Accordingly, a simple conversion of the signals CIX and CIY (circular) to values in terms of signals PIX and PIY is performed in the component resolver 250 (FIG. 8).

In the above expressions, the letter D represents a constant of small fractional value. Thus, each incremental value of signals CIX and CIY is the previous value with an increment whereby the sequence of values define (point by point) an arcuate or circular path. That is, the current values, in each coordinate are incremented (or decremented) by a non-linear value which is derived from the value in the other coordinate. Essentially, as indicated, the incremental steps involve digital integration.

Figure 10:
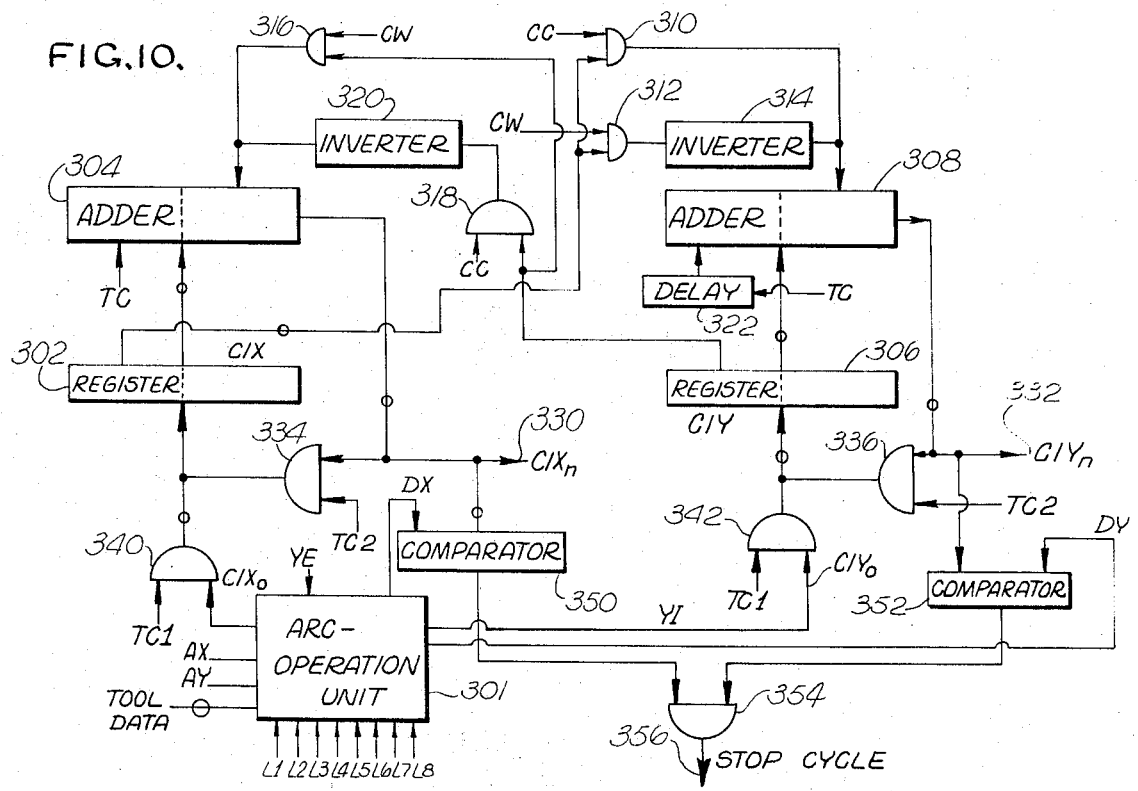
FIG. 10 is a block diagram of still another component of the system as represented in FIG. 5.

In general, the accomplishment of digital integration by addition is well known in the prior art. However, the operation of a pair of integrators as shown in FIG. 10 to accomplish increments in coordinate values (each derived from the other) as defined by the above equations affords a very simple embodiment for the solution of a rather complex problem.

Prior to considering the detail structure of FIG. 10 reference will be made to the analytical presentation of FIG. 11 describing the operation of the system to increment (or decrement) the existing values of CIX and CIY so that the sequence of values define a circular pattern.

Considering the above equations, each fresh value of CIY consists of the prior value of CIY minus (or plus if D is negative) an increment: $D(CIX)_n$. As indicated, "D" is a constant of small fractional value, which may be positive or negative and which is applied to the last value of signal CIX. Each fresh value of CIX is developed somewhat similarly from the previous value plus an increment (or decrement) which is the product of the constant D and the last value of CIY. Again, it is to be noted that the values of signals CIY and CIX are in coordinate form referenced to the center of the arc being developed as disclosed in detail below. Generally, the coordinate shift is accomplished by comparing the X Y coordinates of arc center (as provided by control switches) with the actual position manifest by the signals AX and AY. Thus, as shown in FIG. 11, an arc or circular path 319 is defined by the sequence of values represented by signals CIY and CIX which are referenced to a center point 321.

Figure 11:
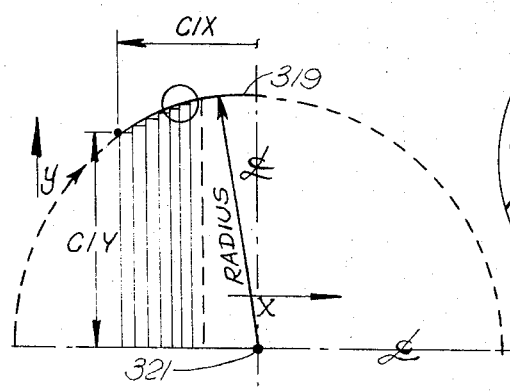
FIG. 11 is a rectangular-coordinate diagram illustrative of still another operation of the system as represented in FIG. 5.
Figure 11A:
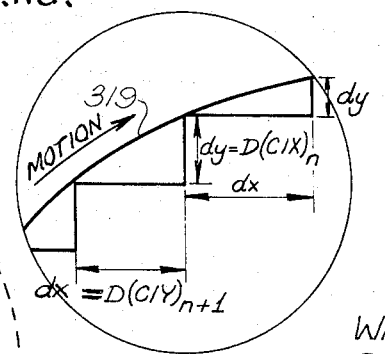
FIG. 11a is an enlarged fragment of the diagram of FIG. 11.

In FIG. 11a which shows an enlarged fragment of FIG. 11, it may be seen that the circular path 319 is described by adding algebraically the increments $dx$ and $dy$ to the previous values of CIX and CIY. Thus, in the terminology utilizer herein, $dx = D(CIY)_{n-1}$ while $dy = D(CIX)_n$.

The system for generating signal-represented values CIX and CIY to command circular motions, as embodied in the component resolver 205 (FIG. 8) is shown in detail in FIG. 10. Generally, as a preliminary operation an arc-operation unit 301 (lower left) identifies the center of an arc or circular pattern to be generated, to which center the signals manifesting increments are referenced. Essentially, the actual position (manifest by signals AX and AY) is translated to a form referenced to the center of the desired circle (coordinate shift) to provide signals $CIX_0$ and $CIY_0$ which are the initial values from which the circle is generated. These values are placed in registers 302 and 306 respectively to initiate the circle-generating operation.

In general, two digital integrators are provided in register-adder combinations. Specifically, the register 302 contains signals CIX, and supplies its contents (in parallel) to an adder 304 which also receives a portion of the contents (CIY) of a register 306 that is coupled to an adder 308. The cross-coupling of the register 302 and 306 through the adders 304 and 308 with the return back to the registers comprises a pair of digital integrators.

The manner in which the registers 302 and 306 are coupled to the adders accomplishes a division by binary digit shifting. Specifically, the most-significant bit stages of the register 302 are coupled through gates 310 and 312 (the latter path including an invert 314) to the least-significant bit stages of the adder 308. Somewhat similarly, the most-significant stages of the binary register 306 are coupled through gates 316 and 318 (the latter with an inverter 320) to the least-significant stages of the adder 304. Thus, a shift occurs to introduce a divisional constant, i.e. value D.

The adders 304 and 308 operate under the control of the timing signal TC (either TC1 or TC2); however, the adder 308 is phase displaced from the operation of the adder 304 by the provision of a delay circuit 322 in the path of the timing signal TC to the adder 308. The operation of this system results in the repeated production (incrementally) of the next values of CIY and CIX. That is, the values developed in the register 302 and 306 respectively designate signal-represented values CIX and CIY in sequence. The values of signals CIX and CIY are converted to the coordinates of the system in the component resolver 250 (FIG. 8) to provide signals PIX and PIY representative of the preliminary incremental values. It is to be recalled that during profiling these signals PIX and PIY are designated "preliminary" because tool offset adjustments have not yet been applied as described with reference to FIG. 8.

As indicated, multiplication by the constant D (as a fraction) is accomplished in the system of FIG. 10 by shifting data transferred from the digital stages of the registers 302 and 306 to the adders 308 and 304 respectively. In one operating embodiment hereof, a satisfactory value of "D" has been found to be $2^{-16}$. In using such a value some 400,000 incremental steps are involved in defining a circle which results in a potential error of less than 20 parts per million in traversing a full 360 degrees.

However, D represents a signed value, i.e. may be either positive or negative. During clockwise movement, "D" is a positive value while the value is negative for counterclockwise movement. The proper sign of the constant D is accomplished (depending upon whether the motion is clockwise or counterclockwise) by "and" gates 310, 316, 312 and 318. Specifically, if the motion to be defined is clockwise, the "and" gates 316 and 312 are qualified with the result that the value CIY from register 306 is supplied as a positive value to the adder 308 while the qualification of the gate 312 results in the value of CIX being supplied to the adder 308 through the inverter 314 thereby accomplishing a subtraction. Conversely, in the event that the motion to be described is counterclockwise, the "and" gates 310 and 318 are qualified so that the value of CIX is supplied directly to the adder 308 as a positive value while the value of CIY is supplied to adder 304 in a negative form as a result of passage through an inverter 320.

It is to be noted that the occurrence of the timing signal TC defines increments in the phase angle. That is, as timing pulses are received, the phase angle is increased, stepwise, with each step resulting in a new incremental value for CIX and CIY. The values so developed are provided from the adders 304 and 308, respectively, as indicated at terminals 330 and 332. These values are also returned to the registers. Specifically, the output from the adder 304 is returned to the register 302 through an "and" gate 334 while the output from the adder 308 is returned to the register 306 through an "and" gate 336. These gates are qualified during the interval of the timing signal TC2.

The initial values as represented by the signals $CIX_0$ and $CIY_0$ are provided through gates 340 and 342 from the unit 301 to the registers 302 and 306. Specifically, the initial value represented by the signal $CIX_0$ is provided through the "and" gate 340 which is qualified with the timing signal TC1. Similarly, the initial value represented by the signal $CIY_0$ is provided through the "and" gate 342, also qualified by the timing signal TC1.

The operation of the sub-system of FIG. 10 is terminated when the indicated next terminal position is attained as indicated by the values of signals DX and DY in rectangular coordinates, i.e. the values of CIY and CIX coincide to values for DY and DX. The signals DX and DY are supplied to comparators 350 and 352 for comparison, respectively, with the values represented by the signals CIX and CIY. Note that a coordinate translation is involved within the comparators. Upon detecting coincidence, the comparators 350 and 352 provide binary signals in a high state to thereby qualify an "and" gate 354, the qualification of which provides a stop-cycle signal SC at an output 356 which is returned to the computer unit 120 (FIG. 5).

The computer unit 120 (FIG. 5) thus includes the components explained above in detail for computing sequences of values to define linear and circular paths. These sets of signals (PIX) then command incremental motions by the machine tool unit 130 under control of the drive units as described in detail. Accordingly, the operator is provided with a set of command switches which enable him to specify complex motion patterns by very simple commands. In that regard, the feature hereof which enables arcuate cuts is also very useful for simplifying the specification of angular cuts, e.g. corners. That is, as explained more fully below, the system can specify a circular path for a milling tool center, and thereby develop an angular corner at the cutting edge of the tool.

Figures 11B, 15:
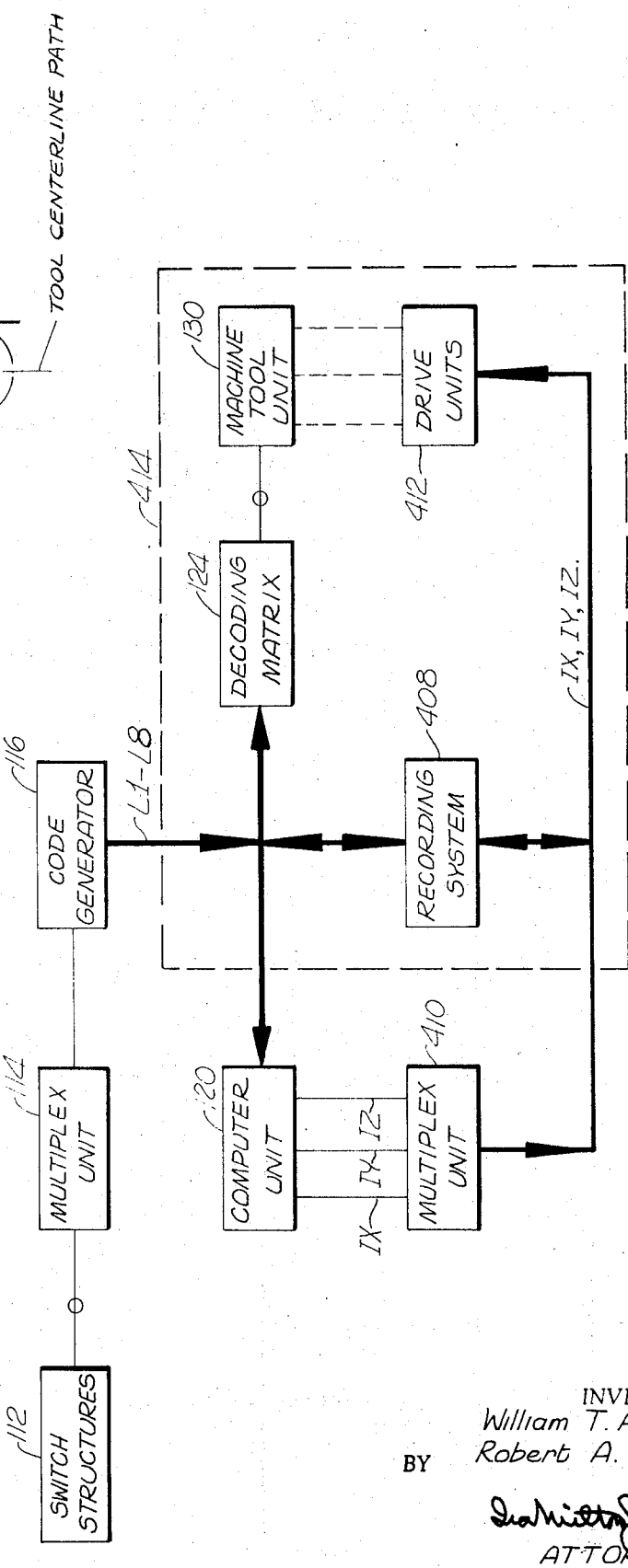
FIG. 11b is a diagram illustrative of the operation of a sub-system of the structure of FIG. 5.
FIG. 15 is a block diagram of an alternate embodiment of the system hereof.

Referring to FIG. 11b, a series of tool positions are indicated by broken line circles 385. As the center line of the represented tool travels an arcuate path 387, the cutting edge of the tool defines an angular corner 389. Accordingly, in the operation of the system hereof, when an arcuate or circular cut of zero radius is specified, the computations are made for the tool center, using the tool radius as the radius of computation. Zero-radius operation is specified by depressing the appropriate quadrant/angle button (panel MR FIG. 3) and dialing in the number of angle degrees on the "DEGREES THUMBWHEEL SWITCH." Thus, minimal operations are required. That is, the tool data signals applied to the arc-operation unit 301 (FIG. 10) provide the radius of the arc as the tool diameter. In that manner, the system is effective to accomplish corners that may be simply and easily specified as zero radius arcuate cuts.

Figure 12:
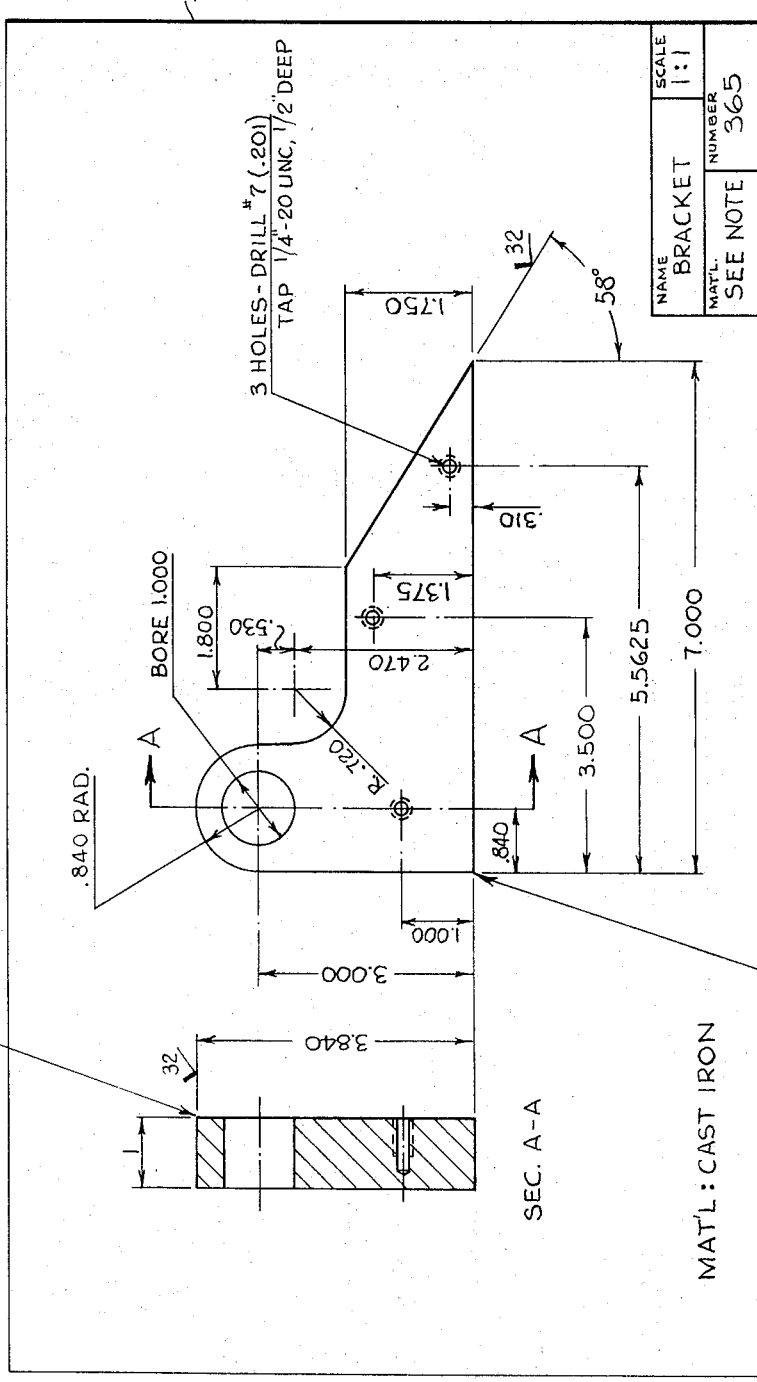
FIG. 12 is a diagram of a part print such as might be produced by a draftsman to specify a desired machined part for production by the system hereof.

To explain the operation of the system hereof in somewhat greater detail, exemplary operations will now be considered. Accordingly, assume that the machine has been turned "on" and that all portions thereof are operative, and hence ready to perform. Assume also that it is desired to machine the workpiece detailed on the print 365, the top view of which is shown in FIG. 12. From this print, a competent machinist will identify the tools needed to perform the various operations by which a piece of raw stock is converted into the desired workpiece. A list of such tools follows:

CUTTING TOOLS

| Tool Sequence | Tool Carrier No. | Tool Type | Tool Diameter | Overall Tool Length |
|---|---|---|---|---|
| 1 | 08 | 4 Flute End Mill | ⅝" | 3 ¾" |
| 2 | 05 | Stub Drill | No. 7 (201") | 2 ¼" |
| 3 | 06 | Hy-Spiral Tap | ¼– 20 UNC | 2 ½" |
| 4 | 03 | Center Drill | No. 18 | 3 ¼" |
| 5 | 07 | Stub Drill | ⅞" | 5" |
| 6 | 02 | Boring Bar with No. 2 Long Cartridge | 1" | 4 ⅛" |

The tools listed are loaded into the magazine of the tool changer 144 (FIG. 5). Briefly, the tool changer comprises a storage magazine having a plurality of tool receptacles or carriers, any selected one of which can be brought to a tool-transfer position (by controlled actuation of the magazine) then transferred by a transfer mechanism from the transfer position to the spindle of the mill and vice versa. The required tools for a job need not be placed in the carrier of the magazine in any particular order, but are identified by numbers (signals TN) in the input data fed into the control system as explained below by the number of the socket which they occupy. As noted, hereinbefore, the tool changer employed in this system is preferably the one forming the subject matter of the copending application of William T. Anderson, Ser. No. 163,267 filed July 16, 1971.

The blank (from which the workpiece is to be cut) is clamped (FIGS. 13 and 14) to the table of the mill by suitable clamp structure, here shown as two toe clamps 362, with the base of a simple locating fixture 364 therebetween to provide tool clearance below the bottom level of the blank workpiece W as shown.

With the "MODE" switch othe manual control panel (FIG. 4) turned to "MANUAL," preliminary alignment and set-up operations are performed. Specifically, the required motion (both direction and magnitude) of the table and saddle is effected to bring the highest spot on the blank W under the spindle, it being understood that the work height capacity of the machine is such that adequate space is available for the work as well as tool insertion and removal. For the workpiece as detailed in FIG. 12, it is sufficient to bring any portion of the blank under the spindle, since the part is of uniform thickness. This is done by depressing the necessary "TABLE," "SADDLE" and "DIRECTION" control switches (panel MD, FIG. 4) along with either the "SLOW" or "FAST" control switches. In an operative embodiment hereof, if the "FAST" control switch is actuated, the motion is at 200 inches per minute. If the "SLOW" control switch is used, the motion is at approximately 1 inch per minute.

With the highest portion of the part blank under the spindle, the "TOOL SET-UP" portion of the manual control panel MD (FIG. 4) is used to input tool diameter for those tools that do profiling, and also input tool length. This requires installing each tool in the spindle and lowering the spindle to a predetermined level. The tools are brought to and installed in the spindle by dialing in the number of the first-to-be-used tool on the "TOOL NUMBER" thumbwheel switch and pressing the "FIRST TOOL" push button. Next the number of the second tool is dialed in and the "NEXT TOOL" push button is depressed. This done, the "TOOL CHANGE" control button is depressed. Immediately the tool changer will function to install the first tool No. 08, i.e. the end mill, in the spindle and bring the second tool No. 05 to a tool-ready location.

With the part blank under the spindle, the spindle down switch on the "MANUAL CONTROL" panel (FIG. 4) is actuated along with the appropriate speed control switch to lower the spindle head until the tool tip just touches the top of the workpiece. If tool diameter is needed, as it is in the case of the end mill, (tool No. 08) that information is dialed in by means of the "TOOL DIA" thumbwheel switches. The tool length and tool diameter for the first tool are next fed into the computer (core memory) by depressing the "TOOL SET" switch.

Next, tool No. 06 (the third tool) is dialed into the "TOOL NUMBER" switch and the "NEXT TOOL" switch is again actuated. Upon depressing the "CHANGE TOOL" switch, the spindle head moves up to its tool change position. Directly thereafter, and as a result of depression of the "CHANGE TOOL" switch, the tool changer and its transfer mechanism function to remove tool No. 08 (the first tool) from the spindle, insert the second tool No. 05 in the spindle and replace tool No. 08 in its respective carrier in the magazine and return to the tool-ready location with the third tool No. 06. Meanwhile, with the second tool No. 05 in the spindle, its length is registered in the computer in the same way as explained in connection with the first tool No. 08. Since the second tool No. 05 is a drill, its diameter is of no concern and hence need not be registered. The same holds true for each of the remaining tools.

After the dimensions of all of the tools have been registered in the computer, the "VERTICAL SET PART REFERENCE" switch is depressed. This zeros out the computer as to tool lengths. If the workpiece is thereafter raised or lowered, it is imperative to repeat the setting of the longest tool so that its tip just touches the top of the work, after which the "VERTICAL SET PART REFERENCE" switch is depressed to re-establish the predetermined spacial relationship between all of the tool tips and the top of the part blank.

The next step is to locate the blank workpiece W as clamped to the table with reference to the spindle axis. For this example, a centering scope is inserted in the spindle.

The table and saddle are then positioned (using appropriate switches on panel MD) to bring the workpiece horizontal reference point A (FIG. 13) under and onto the spindle axis, as represented by the reticule of the centering scope. In this example, the X-axis cross-hair is to coincide with the front edge of the workpiece (Y zero) and the Y-axis cross-hair should be positioned approximately three-sixteenths inch to the right of the left edge of the workpiece — the three-sixteenths inch representing the machining allowance of this particular casting. This done, the set part reference switch "HORIZONTAL" is depressed to zero out the computer's table and saddle position data. Next the centering-scope is removed from the spindle.

This concludes machine and tool set-up procedures so that manual machining of the part and the recording of the operations involved therein can be undertaken. The first step in this procedure is to move the "MODE" switch (FIG. 4) to "TAPE PREPARATION."

It should be understood that depression or actuation of any of the switches on the tape preparation panel MR (FIG. 3) will not effect any action until either of the "OPERATION TEST" switches (FIG. 4) or the "OPERATION ENTER" switch (FIG. 3) is actuated. These "OPERATION TEST" switches (Panel MD) are used to check for error that might have been made while registering data in the computer by means of the tape preparation panel MR without recording the data on tape. Either of these two "OPERATION TEST" switches must be held depressed to effect the desired motions for test procedures.

As indicated on the buttons of the two "TEST" switches, one of them is concerned with rapid travel motion; the other with feed motion. Since each successive operation, or geometry segment may be verified for accuracy before it is recorded on the permanent record (tape) either of these switches can be actuated after each step.

The first step is to install tool No. 08 (five-eighths inch end mill) in the spindle. The next step is to center the tool over point A' (FIG. 13) which point is offset to the left of reference point A by the radius of the end mill, and offset to the front of reference point A by an eighth of an inch plus the end mill radius (the one-eighth inch is an arbitrary clearance selected by the operator). The spindle is then lowered to cut depth. These functions are accomplished by actuating the following switches: the "CHANGE TOOL" switch (FIG. 3); the "SPINDLE FWD" switch (Forward or right-hand rotation); the "COOLANT OFF" switch (since the material being machined is cast iron); the "MILL" switch, the "RAPID TRAVEL" switch; the "SPINDLE RPM" switches; and the "CUT DEPTH" switches. (This latter dimension is referenced from the top of the part blank, and in this case should be approximately 1.125 inch since the part blank is 1 inch thick).

Continuing with the instructions to be inputted, the machine operator presses the tool position/direction switch PB8, presses either the "PART REFERENCE" or "INCREMENTAL" switch (either one – since in this instance both refer to part-zero); actuates the "front direction" switch 44 and dials in 00.1250 (one-eighth inch) on the TOOL FRONT/BACK switches.

At this point, the machine operator has three choices. He may employ panel MD (FIG. 4) and the operation test switches and make an actual cut by depressing the "FEEDS" switch; or he may choose to check an approximation of the functions and geometry involved by depressing the "RAPID TRAVEL" switch; or, thirdly, he may decide that the inputs are of a simple nature and omit any trials, by depressing the "OPERATION ENTER" switch on panel MR (FIG. 3).

For this example, it will be presumed that the first operation is initiated by momentarily depressing the "RAPID TRAVEL" switch on the operation test panel (FIG. 4). Its depression will initiate a sub-routine (or program) called tape prep pre-start stored in the computer memory (core memory and read only memory) to verify that pre-start conditions are in order and, if not, the computer will issue commands in proper sequence to establish proper pre-start status or flash appropriate error lights. When all pre-start conditions are in order, the tool changer will remove the first and second tools from its magazine, install the first tool (from carrier No. 08) in the spindle, and bring the second tool (No. 05) to the tool ready position, at which time the spindle, table and saddle are ready to be activated by again depressing the "RAPID TRAVEL" switch on the "operation test" panel, (FIG. 4). Upon its depression the table and saddle will be moved to bring the part blank to the position at which point A' is directly under the tool, and the tool will descend rapidly to a level 0.001 above the top surface of the part blank and stop. Then when all commands have met the machine stops.

Bearing in mind that for the preceding functions to have occurred, it was necessary to hold the "RAPID TRAVEL TEST" switch button depressed, it follows that in the event any deviation from the desired result is observed, release of the "RAPID TRAVEL TEST" switch will immediately halt all motion of the table, saddle and spindle head. If this occurs, the "OPERATION DELETE" switch should be actuated. This causes the spindle head, the table and the saddle to return to the positions they occupied before initiation of the just defined operation, and erase from core memory all data from the tape preparation panel MR.

Assuming however no such error was detected, the "FEED TEST" switch is depressed and held down. This results in the tool descending under rapid travel mode alongside the part blank to the predetermined depth, i.e. one-eighth inch below the bottom of the blank. Again, if the operator detects any variance from the desired results, he can, by releasing the "FEEDS" test switch and depressing the "OPERATION DELETE" switch, restore the spindle head, table and saddle to their original positions allowing the operator to try again.

When this just defined operation has been satisfactorily performed, the "OPERATION ENTER" switch is depressed. This records all of the information necessary to repeat that operation, and clears the appropriate portion of the "TAPE PREPARATION" panel for successive operations.

With the end mill at its predefined depth at point A', the relative motion between the table and the tool necessary to effect a horizontal cut on the Y axis to bring the tool to point B is effected by depressing the tool position switch PB2; depressing the back direction control switch 46; pressing the "PART REFERENCE" switch; and dialing in 03.0000 on the "TOOL FRONT-BACK" thumbwheel switches, thus effecting the first geometric segment of the work part profile. The results can be verified and corrected if necessary.

The second geometric segment requires relative motion between the table and the tool to bring the latter from point B to point C. This is done by depressing the tool position switch PB2; the arcuate quadrant switch 50; dialing in 00.8400 on the "RADIUS" thumbwheel switches; depressing the "CW" switch; depressing the angle value switch 56 and dialing in 90.000 on the "DEGREES" thumbwheel switches. Again the results can be verified before these instructions are permanently recorded.

In effecting the third geometric segment relative motion between the table and the tool will take place to bring the tool from point O to point D. This involves, depressing tool position switch PB2, "INCREMENTAL" switch, front direction switch 44; and dialing in 00.5300 on the "TOOL FRONT-BACK" switches. Again, the results can be verified in the manner already described before these instructions are permanently recorded.

In effecting the fourth geometric segment, the tool moves from point D to point E, as a result of depressing tool position switch PB2; "INCREMENTAL" switch; arcuate travel switch 52; dialing in the radius 00.7200 in the "RADIUS" thumbwheel switches; the "LEFT-RIGHT" thumbwheel switches; depressing the "CCW" switch and the angle control switch 60; and dialing in 180.000 on the "DEGREE" thumbwheel switches. After the normal testing operations are effected, these instructions are permanently recorded.

In the fifth segment the tool will move from point E to point F, and to produce that motion the following switches are actuated: tool position switch PB2; "INCREMENTAL;" and right direction control 42, and dialing in 01.8000 on "TOOL LEFT-RIGHT" switches, followed by testing and recording.

In segment No. 6 the tool moves from F to F', and to produce that motion the following switches are actuated: tool position switch PB2; arcuate travel switch 58; "INCREMENTAL;" "CW;" and angle control 56; 032.000 is dialed in on "DEGREES" thumbwheel switches, and 000.000 is dialed in on the "RADIUS" thumbwheel switches. Again, test and record.

The final milling segment brings the tool from point F' to point G, and is produced by actuating the following switches: tool position switch PB3; "PART REFERENCE," front and right direction control switch 44 and 42; dialing in 07.0000 on the "TOOL LEFT-RIGHT" thumbwheel switches, and dialing in 000.000 on the "TOOL FRONT-BACK" switches. Again — test and record.

Tool No. 08 has now completed its work, and must therefore be replaced by the second tool No. 05. This will be accomplished by actuating the following switches: the "CHANGE TOOL" switch; the "SPINDLE FWD" switch; the "COOLANT OFF" switch; and the "DRILL", "RAPID RETURN" switch; there the desired RPM for tool No. 05 is dialed in on the "SPINDLE RPM" switches; the desired vertical feed rate is dialed in on the "VERT FEED" switch; 00.8200 is dialed in on the "CUT DEPTH" switches; the right and back control switches 42 and 46 respectively are depressed; the "PART REFERENCE" switch is actuated; 00.8400 is dialed in on the "TOOL LEFT-RIGHT" thumbwheel switches; and 01.0000 is dialed in on the "TOOL FRONT-BACK" thumbwheel switches.

To effect the various motions involved in bringing the second tool No. 05 to point H and to within 0.100 inch of the surface of the blank as set up by the preceding switch actuators, the "RAPID TRAVERSE TEST" switch is depressed and held. When the tip of the drill (tool No. 05) is 0.100 inch from the surface of the blank the machine automatically stops. Depression and holding of the "FEED TEST" switch causes the tool to cut to the desired depth and to retract back to 0.100 inch above the blank. If the operator is satisfied that the operation has been accurately performed, the "OPERATION ENTER" switch is actuated to record the previous instructions.

The next operation involves raising the tool (No. 05) to a height sufficient to clear the adjacent toe clamp. It is done by depressing the "RAPID TRAVEL" switch; dialing in 00.6850 (which is sufficient clearance for a five-eighths inch thick toe clamp) on the "VERT RAPID POINT" switches; depressing the "VERTICAL RAPID POINT UP" switch and depressing the "OPERATION ENTER" switch. This raises the tool the required distance and also records the instructions to do so.

The tool must now be moved to point I, and this is accomplished by depressing the right and back direction switches 42 and 46, respectively; dialing in 03.5000 on "TOOL LEFT-RIGHT" thumbwheel switches; and dialing in 01.3750 on the "TOOL FRONT-BACK" thumbwheel switches. Upon testing and recording the tool will be above point I at the elevation to which it was brought to clear the toe clamp.

Now the tool is to be brought down to 0.100 inch above the work. This is done by resetting the "VERTICAL RAPID POINT" switches to 000.000, and then depressing the "VERT RAPID POINT DOWN" switch, thus returning to the original vertical rapid point (i.e. point .100 above workpiece), and depressing the "OPERATION ENTER" switch.

The second hole will now be drilled at point I by simply depressing the "DRILL," "RAPID RETURN" switch and the "OPERATION ENTER" switch.

With the hole drilled at point I, the appropriate switches will be actuated to retract the drill to an elevation sufficient to clear the other toe clamp, move the drill to point J, and drill the hole there. The manner in which this is accomplished will be clear from the preceding description. With this last of the three holes drilled, a tool change cycle is in order to replace the drill (tool No. 05) with the tap, tool No. 06. This is done in the manner described in changing from the first to the second tool.

To effect the tapping of the hole at point J, the operations are identical with those described for the drilling except that, in lieu of the "DRILL" switch, the "TAP" switch is depressed, and 20 is dialed in on the "THREADS/INCH" thumbwheel switches.

When the hole at point J is tapped and the tool backed out, table, saddle and spindle head motions will be effected to bring the tool (the same tap) successively to points I and H at which points the holes thereat will be tapped.

Upon completion of the last tapping operation, a tool change is again effected (through actuation of the appropriate switches) in insert tool No. 03, i.e. the center drill in the spindle; and as noted hereinbefore, the machine will drill a center hole at point K. This done, another tool change is effected to replace the center drill with the seven-eighths inch drill, tool No. 07. The seven-eighths inch hole is drilled automatically upon completion of the tool change.

The seven-eighth inch drill must now be replaced with the boring bar (which is tool No. 02) set to 0.990 inch diameter, although the final dimension of the bored hole will be 1.000 inch.

Since the boring operation is the last, in the machining of the part, it may be well to spell out in detail how that is done and the system brought back to its pre-start condition ready for the next part to be machined.

To effect the tool change and the boring operation, the following switches are actuated: the "CHANGE TOOL" switch; the "SPINDLE FWD" switch; the "COOLANT OFF" switch; the "BORE, RAPID OUT" switch; the "INSPECTION STOP" switch; and the desired RPM is dialed in on the "SPINDLE RPM" thumbwheel switches; the desired vertical feed rate is dialed in on the "INCHES PER REV" thumbwheel switches; 01.1250 is dialed in on the "CUT DEPTH" thumbwheel switches; the back direction control switch 46 is actuated; the "PART REFERENCE" switch is depressed; and the dimension 03.000 is dialed in on the "FRONT BACK" thumbwheel switches. This conditions the system for the actuation of the "FEEDS" test switch, whereupon the boring tool will reach its full cut depth and spindle rotation will stop, with the tool point on the X axis facing right. The workpiece is then moved to the right relative to the spindle axis to disengage the tool point from the work. The boring bar is now retracted to an elevation permitting inspection of the bored hole, since the "INSPECTION STOP" switch has been depressed. Inspection consists in checking the diameter of the bored hole, and based upon the findings, the tool is adjusted to the desired dimension of 1.000 inch, whereupon another boring operation is effected in the manner described. It should be noted that, despite this repeated boring operation, only one boring operation is recorded on the tape when the "OPERATION ENTER" switch is depressed. To stop the machine in its pre-start condition, the "PART COMPLETE ENTER" switch is depressed to put a rewind code on the magnetic tape, and also effect rewinding of the tape to its starting position. Also, with depression of this switch, the machine is brought to its pre-start condition with the spindle centered above the horizontal part reference point — point A in FIG. 5, the instructions for these functions being derived from programmed data contained in the computer memory.

The manually controlled machining operation is now complete and a permanent record of the operations involved therein is stored on the tape for future tape-controlled duplication of those operations.

It will be apparent to those skilled in the art that the system hereof may be variously implemented in accordance with the various design considerations and component availability. In that regard, the computer unit embodied in the system hereof may comprise a unit manufactured by Micro Systems, Inc. of Santa Ana, California, designated Basic Model 810. In one operating embodiment of the present system the tape unit consisted of a Model TT100 manufactured by Sykes Datatronics, Inc. of Rochester, New York. The switches provided in the switch panels in an operating embodiment hereof included pushbutton switches of Series PMZH manufactured by Honeywell and thumbwheel switches available from Digitron, Inc. of Pasadena, California.

With regard to alternative arrangements of the components to comprise a system in accordance herewith, as suggested, many specific forms may be used. In that regard and example of such forms an alternative arrangement is shown in FIG. 15 and will now be considered.

The components of the system of FIG. 15, which have been previously described, as with reference to the system of FIG. 5, bear similar identification numbers and function in substantially a similar manner. Specifically, switch structures 112 provide manual input signals which are sequenced through a multiplex unit 114 for conversion into a binary code word by a code generator 116. The binary code word formed by the code generator 116 (as in the previous example) includes eight binary bits which designate various operations, changes of state, and so on, as well as specifying particular movements. Those codes which designate changes in state or other operations are identified by the decoding matrix 124 to command a specific operation in the machine tool unit 130. For example, such codes may command the flow of lubricant, tool rotation direction and so on.

The command codes (as represented by the signals L1 – L8) which command specific relative motions between the workpiece and the spindle are sensed by the computer unit 120 to derive three sets of signal codes, specifically signals IX, IY and IZ indicative of the desired incremental displacements between the workpiece and the spindle to accomplish the desired path. Such sets of signals (IX, IY and IZ) are serialized by a multiplex unit 410 and supplied to a recording system 408 and to the drive units collectively represented by a block 412.

During the initial formulation of the program coincidental with the production of the desired workpiece, the signals IX, IY and IZ are recorded by the recording/reading system 408 along with the signals L1 – L8, representative of operation code words which are sensed by the decoding matrix 124. Accordingly, the recording/reading system 408 carries a record of operation-commanding code words represented by the signals L1 – L8 and movement-commands represented by the code words IX, IY and IZ. Consequently, the portion of the system defined within the block 414 operates independently during the reproduction of duplicate workpieces. In one form of the system, the structure within the block 414 may be provided as a slave unit without an interconnected computer, code generator and so on.

The system hereof thus has several important features which include: simple program development, simplified specification of motion patterns; economical structure for predicting dimensions, and others as set forth more specifically in the claims hereof. For ease of reference, a list of signals identified herein is tabulated below.

| SIGNAL | SOURCE | TYPE | DEFINITION |
|---|---|---|---|
| ADDR | Block 125 | D | Address information |
| AU | Manual control | T | Automatic state |
| AVX | D-A converter (drive circuit) | A | Velocity analog signal |
| AVY | D-A converter (drive circuit) | A | Velocity analog signal |
| AVZ | D-A converter (drive circuit) | A | Velocity analog signal |
| AX | Position sensor | S9 | Actual position of table |
| AY | Position sensor | S9 | Actual position of saddle |
| AZ | Position sensor | S9 | Actual position of spindle |
| CA | Computer | | Generic to non-motion tool commands |
| CC | Manual control | S7 | Counter-clockwise spindle rotation |
| CF | Manual control | S2 | Coolant off |
| CH | Manual control | S9 | Depth of cut |
| CIX | Arc operation unit 301 | S9 | Circular increments |
| CIY | Arc operation unit 301 | S9 | Circular increments |
| CL | Manual control | S5 | Tool on center |
| CN | Manual control | S2 | Coolant on |
| CTN | Manual control | S1 | Commands tool change |
| CT | Manual control | S5 | Tool stop on center |
| CW | Manual control | S7 | Clockwise spindle rotation |
| CX | Computer | | Command signal for table |
| CY | Computer | | Command signal for saddle |
| CZ | Computer | | Command signal for spindle |
| DG | Manual control | S9 | Degrees |
| DL | Manual control | S3 | Commands stop point |
| DW | Manual control | S8 | Drilling operation |
| DX | Computer | S9 | Desired position of table |
| DY | Computer | S9 | Desired position of saddle |
| DZ | Computer | S9 | Desired position of spindle |
| ΔX | Digital adder 174 | S9 | Incremental motion value |
| ΔY | Digital adder Y | S9 | Incremental motion value |
| ΔZ | Digital adder Z | S9 | Incremental motion value |
| FA | Manual control | S6 | Angle fourth quadrant |
| FB | Manual control | | Front or rear movement |
| FO | Manual control | S9 | Feed out (bore) |
| FQ | Manual control | S8 | Radial/hypotenuse 4th quadrant |
| FT | Manual control | S6 | First tool routine |
| H | Manual control | S5 | Halt all power |
| HF | Manual control | S1 | Horizontal feed rate |
| IN | Manual control | S9 | Generic to manual control signals |
| IR | Manual control | S4 | Incremental reference |
| IX | Computer unit 120 | S9 | Next incremental position-table |
| IY | Computer unit 120 | S9 | Next incremental position-saddle |
| IZ | Computer unit 120 | S9 | Next incremental position-spindle |
| LA | Computer control system | S3 | Lamp control signals |
| LR | Manual control | S9 | Left or right movement |
| LT | Manual control | S5 | Last tool routine |
| L1 | Code generator 116 | S9 | Binary code digit 1 |
| L2 | Code generator 116 | S9 | Binary code digit 2 |
| L3 | Code generator 116 | S9 | Binary code digit 3 |
| L4 | Code generator 116 | S9 | Binary code digit 4 |
| L5 | Code generator 116 | S9 | Binary code digit 5 |
| L6 | Code generator 116 | S9 | Binary code digit 6 |
| L7 | Code generator 116 | S9 | Binary code digit 7 |
| L8 | Code generator 116 | S9 | Binary code digit 8 |
| MC | Drive units | S1 | Movement complete |
| MLL | Manual control | S8 | Mill |
| ML | Manual control | S5 | Manual state |
| NT | Manual control | S5 | Next tool routine |
| OA | Manual control | S6 | Angle first quadrant |
| OD | Manual control | S7 | Delete last operation |
| OE | Manual control | S7 | Record last operation |
| OQ | Manual control | S6 | Radial/hypotenuse 1st quadrant |
| PA | Manual control | S1 | Clear panel |
| PC | Manual control | S7 | Part is complete |
| PIX | Component resolver 250 | S9 | Preliminary incremental |
| PIY | Component resolver 250 | S9 | Preliminary incremental |
| PIZ | Component resolver 250 | S9 | Preliminary incremental |
| PR | Manual control | S1 | Movements referenced to part |
| RH | Manual control | S9 | Radius/hypotenuse |
| RO | Manual control | S8 | Rapid out (bore) |
| RR | Manual control | S8 | Rapid return |
| RT | Manual control | S8 | Rapid travel |
| SA | Manual control | S6 | Angle second quadrant |
| SC | Gate 354 | S1 | Stop arc generating cycle |
| SF | Manual control | S5 | Spindle forward |
| SQ | Manual control | S6 | Radial/hypotenuse 2nd quadrant |
| SR | Manual control | S5 | Spindle reverse |
| SS | Manual control | S9 | Spindle speed |
| TA | Manual control | S6 | Angle third quadrant |
| TAP | Manual control | S8 | Tap |
| TBC | Computer unit 120 | S1 | Timing signal |
| TCI | Manual control | S10 | Tool center line-inside |
| TCT | Manual control | S10 | Tool center line tangent |
| TC1 | Computer unit 120 | S1 | Timing signal |
| TC2 | Computer unit 120 | S1 | Timing signal |
| TD | Manual control | S4 | Threshold down |
| TE | Computer unit 120 | S1 | Timing signal |
| TF | Manual control | S4 | Tool move forward |
| TI | Manual control | S9 | Threads per inch |
| TL | Manual control | S4 | Tool move left |
| TLI | Manual control | S10 | Tool left offset inside |
| TLO | Manual control | S10 | Tool left offset outside |
| TLT | Manual control | S10 | Tool left offset tangent |
| TN | Manual control | S9 | Tool number |
| TOX | Correction unit 252 | S9 | Tool correction value (X) |
| TOY | Correction unit 252 | S9 | Tool correction |

| | | | |
|---|---|---|---|
| TP | Manual control | S5 | value (Y) Tape preparation state |
| TQ | Manual control | S6 | Radial hypotenuse 3rd quadrant |
| TRI | Manual control | S10 | Tool right inside |
| TRO | Manual control | S10 | Tool right outside |
| TRT | Manual control | S10 | Tool right tangent |
| TR | Manual control | S4 | Tool move right |
| TS | Computer unit 120 | S1 | Timing signal |
| TU | Manual control | S4 | Threshold up |
| UC | Manual control | S5 | Tool stop short |
| VF | Manual control | S9 | Vertical feed inches/rev. |
| VR | Manual control | S9 | Vertical threshold for rapid movement |
| VX | Computer unit 120 | S9 | Velocity indication |
| VY | Computer unit 120 | S9 | Velocity indication |
| VZ | Computer unit 120 | S9 | Velocity indication |
| XE | Arc unit | S9 | End of arc (X component) |
| XI | Arc Unit | S9 | Start of arc (X component) |
| YE | Arc unit | S9 | End of arc (Y component) |
| YI | Arc unit | S9 | Start of arc (Y component) |

We claim:

1. In a system for automating control of a machine tool which includes a movable structure, as for accomplishing cuts on a work piece, and further including auxiliary operation structures, the improvement whereby use of programming codes is obviated and instead shop language inputs are utilized, comprising:
manually operable input means bearing self-explanatory indicia representative of the desired relationship between tool center point and the work piece for use in specifying a desired result of operation for the machine tool;
means responsive to said input means for generating code signals indicative of commands for both said auxiliary operation structures and displacements for said movable structure;
means for recording said code signals;
decoding means for actuating auxiliary operation structures of said machine tool in response to certain of said code signals;
computer control means for displacing said movable structure automatically in response to certain of said code signals, to account for tool radius in the direction of tool motion and perpendicular to the direction of tool motion in response to other of said code signals; and
control means for supplying said code signals to said decoding means and said computer control means selectively from said means for generating code signals and said means for recording to automate a series of operations.

2. A system according to claim 1 wherein said means for recording said code signals includes a temporary storage means for registering a multitude of tool dimensions represented by certain of said code signals and for registering a series of related blue print dimensions represented by others of said code signals pending operation of said decoding means and said computer control means; a record means for providing a record of said signals; and manual means for controlling said record means to record code signals from said temporary storage means.

3. A system according to claim 1 wherein said computer control means includes means for registering a value representative of the radius of one of said cutting tools, and wherein said computer control means further includes means for displacing said movable structure automatically in response to certain of said code signals thereby moving the tool center point in an arc of radius equal to the radius of the cutting tool.

4. A system for automating control of a machine tool which tool includes a work piece support, a spindle, and means for moving said spindle in relation to said work piece support and for moving said work piece in relation to said spindle to accomplish machining operations, comprising;
means for providing current-position signals indicative of the existing positional relationship between said work piece support and said spindle;
manually operable means for providing sets of digital designation signals referenced to said current-position signals for designating a geometric segment having an end point with a desired positional relationship between said work piece support and said spindle;
means for recording said sets of digital designation signals;
computer means for receiving said current position signals and a series of related blue-print dimensions and computing therefrom designation signals referenced to said current position signals to provide incremental motion control signals definitive of a geometric segment between said existing positional relationship and said desired positional relationship;
drive means for actuating said means for moving said machine tool under control of said incremental motion control signals to attain said desired positional relationship between said work piece and said spindle; and
control means for providing said digital designation signals to said computer means selectively from said manually operable means and said means for receiving whereby to register a sequence of operations then automate the repetition of that sequence.

5. A system according to claim 4 wherein said manually-operable means includes input means bearing self-explanatory indicia for providing profile signals definitive of a geometric segment between said existing positional relationship and said desired positional relationship and wherein said computer means receives said profile signals to provide said incremental motion signals, and wherein said computer means receives signals indicative of tool radius for accurately computing corrected incremental motion control signals to define circular and line profiles.

* * * * *